United States Patent
Remmel et al.

(10) Patent No.: US 11,938,798 B2
(45) Date of Patent: Mar. 26, 2024

(54) OPENABLE STRUCTURE FOR A SUBSTRUCTURE

(71) Applicant: European Trailer Systems GmbH, Moers (DE)

(72) Inventors: Roger Remmel, Remscheid (DE); Marcus Leukers, Kalkar (DE); Volker Biesenbruck, Rees (DE)

(73) Assignee: EUROPEAN TRAILER SYSTEMS GMBH, Moers (DE)

( * ) Notice: Subject to any disclaimer, the term of this patent is extended or adjusted under 35 U.S.C. 154(b) by 797 days.

(21) Appl. No.: 17/041,824

(22) PCT Filed: Mar. 26, 2019

(86) PCT No.: PCT/DE2019/100287
§ 371 (c)(1),
(2) Date: Sep. 25, 2020

(87) PCT Pub. No.: WO2019/185093
PCT Pub. Date: Oct. 3, 2019

(65) Prior Publication Data
US 2021/0023924 A1 Jan. 28, 2021

(30) Foreign Application Priority Data

Mar. 27, 2018 (DE) .......................... 202018101713.6
Aug. 20, 2018 (DE) .......................... 202018104780.9

(51) Int. Cl.
*B60J 7/06* (2006.01)
*B65D 88/12* (2006.01)
(Continued)

(52) U.S. Cl.
CPC ............... *B60J 7/065* (2013.01); *B60J 7/061* (2013.01); *B60J 7/062* (2013.01); *B65D 88/125* (2013.01);
(Continued)

(58) Field of Classification Search
CPC . B60J 7/062; B60J 7/065; B60J 7/061; B65D 88/125
(Continued)

(56) References Cited

U.S. PATENT DOCUMENTS 3,901,548 A * 8/1975 Seaman, Jr. ............. B60J 7/062
296/100.18
4,547,014 A * 10/1985 Wicker .................... B60J 7/065
160/84.06
(Continued)

FOREIGN PATENT DOCUMENTS

DE 1430628 11/1968
DE 3540128 A1 5/1987
(Continued)

OTHER PUBLICATIONS

International Preliminary Report on Patentability dated Sep. 29, 2020 corresponding to application No. PCT/DE2019/100287.

Primary Examiner — Jason S Morrow
(74) Attorney, Agent, or Firm — Nath, Goldberg & Meyer; Joshua B. Goldberg

(57) ABSTRACT

The invention relates to an openable structure for a substrate, such as a lorry, trailer, semitrailer, railway wagon, dumper truck or container, comprising a tarpaulin framework to which, for example, a tarpaulin made of weather-resistant material or a plurality of hingedly couplable wall elements can be connected, wherein the tarpaulin framework has a plurality of slides which are shiftable along at least one guide, wherein the guide comprises a longitudinal member element along which the slides are shiftable. An openable structure permitting smooth opening and closing of the structure is provided according to the invention in that the longitudinal member element is arranged adjustably at least (Continued)

in sections in a direction transversely with respect to the shifting direction of the slides.

21 Claims, 16 Drawing Sheets

(51) Int. Cl.
    *B60P 1/28*           (2006.01)
    *B61D 39/00*        (2006.01)
    *B62D 33/04*        (2006.01)

(52) U.S. Cl.
    CPC .............. *B60P 1/28* (2013.01); *B61D 39/002* (2013.01); *B62D 33/04* (2013.01)

(58) Field of Classification Search
    USPC .......................... 296/100.12, 100.13, 100.18
    See application file for complete search history.

(56) References Cited

U.S. PATENT DOCUMENTS

| | | | |
|---|---|---|---|
| 5,338,084 A * | 8/1994 | Wardell | B60J 7/062 |
| | | | 296/105 |
| 5,546,972 A | 8/1996 | Wardell et al. | |
| 6,502,890 B1 * | 1/2003 | Fliege | B60J 7/102 |
| | | | 296/105 |
| 6,561,564 B1 * | 5/2003 | Fliege | B65D 88/125 |
| | | | 296/100.11 |
| 6,595,573 B1 * | 7/2003 | Drasch | B60J 7/062 |
| | | | 296/100.18 |
| 6,948,761 B2 * | 9/2005 | Haack | B60J 7/102 |
| | | | 296/100.18 |
| 7,607,714 B2 | 10/2009 | Wheatley | |
| 8,240,741 B2 * | 8/2012 | Remmel | B60J 7/065 |
| | | | 296/100.15 |
| 9,701,348 B2 * | 7/2017 | Damsi | B60J 7/062 |
| 2002/0113456 A1 * | 8/2002 | Schall | B60J 7/062 |
| | | | 296/100.11 |

FOREIGN PATENT DOCUMENTS

| | | |
|---|---|---|
| DE | 4007937 A1 | 9/1991 |
| DE | 102005028538 A1 | 12/2006 |
| DE | 102012017897 A1 | 3/2014 |
| GB | 1066748 A | 4/1967 |
| GB | 1430628 A | 3/1976 |
| GB | 2387153 A | 10/2003 |
| GB | 2387153 B | 10/2005 |
| JP | H0333717 U | 4/1991 |
| JP | H0754015 Y2 | 12/1995 |
| JP | 2016179750 A | 10/2016 |

* cited by examiner

OPENABLE STRUCTURE FOR A SUBSTRUCTURE

This is a National Phase Application filed under 35 U.S.C. 371 as a national stage of PCT/DE2019/100287, filed Mar. 26, 2019, an application claiming the benefit of German Application No. 202018101713.6, filed Mar. 27, 2018, and German Application No. 202018104780.9, filed Aug. 20, 2018, the content of each of which is hereby incorporated by reference in its entirety.

The invention relates to an openable superstructure for a substructure, such as a truck, trailer, semitrailer, railway wagon, dumper truck, container, or the like.

Openable superstructures for substructures of various designs are known from practice, which are either transportable, such as a truck, trailer, semitrailer, railway wagon, dumper truck, or container, or are also stationary, such as carports, swimming pools, houses, or the like. The known superstructures include a folding-top framework to which, for example, a tarpaulin made of weather-resistant material or a plurality of hingedly couplable wall elements, which in the closed state form an at least predominantly closed wall, such as a roof or a side wall, can be connected, the folding-top framework comprising a plurality of carriages which are displaceable along at least one guide. The guide in this case comprises a longitudinal beam member along which the carriages are displaceable, the longitudinal beam member itself having high rigidity. If the folding-top framework is now shifted along longitudinal beam members for opening the superstructure, it is necessary for one of the folding-top framework and the longitudinal beam member to be able to yield in order to overcome tolerances or plastic deformations. A disadvantage of the openable superstructures known from practice, however, is that the yielding component, optionally a strut of the folding-top framework or the longitudinal beam member, must be of correspondingly weak dimensions, which can lead to premature wear or even breakage.

DE 35 40 128 A1 describes a longitudinal beam member which is designed as a rail for a rail vehicle and which has a region which tapers downward and is penetrated by a thread bolt which is fixed in the boundary surfaces which laterally delimit the longitudinal beam member. The region between the boundary surfaces and the longitudinal beam member is filled with elastic intermediate layers.

DE 1 430 628 A describes an openable superstructure for a substructure, the superstructure comprising a folding-top framework to which a tarpaulin can be connected. The folding-top framework comprises a plurality of carriages, each of which are displaceable along a guide designed as a longitudinal beam member, wherein opposite carriages are coupled to one another by means of a strut. The carriage is designed as a carriage having four support rollers and two guide rollers, the guide rollers being laterally centered therein by means of leg flanges of the guide. The folding-top framework allows the opening and closing of the superstructure without the adjacent carriages being connected to one another, by virtue of the fact that the strut introduces a substantially punctiform vertical load into the carriage. The longitudinal beam member comprises a plurality of section parts which are fixed horizontally via support pieces and connecting pieces arranged on stands. The stand can be fixed in height in a carrier in discrete steps by hand and makes possible different vertical positions of the longitudinal beam member, the adjustment not being achieved by moving the carriage. A disadvantage of the known superstructure is in particular that the struts having the carriages tend to tilt when the force for displacement acts on one side.

It is the object of the invention to provide an openable superstructure which allows the opening and closing of the superstructure in a simple manner.

This object is achieved according to the invention by an openable superstructure with the features of an independent claim.

According to an aspect of the invention, an openable superstructure for a substructure, such as a truck, trailer, semitrailer, railway wagon, dumper truck, container, or the like, is provided, comprising a folding-top framework to which, for example, a tarpaulin made of weather-resistant material or a plurality of hingedly couplable wall elements can be connected, wherein the folding-top framework has a plurality of carriages which are displaceable along at least one guide, wherein the guide comprises a longitudinal beam member along which the carriages are displaceable. The openable superstructure distinguishes in that the longitudinal beam member is arranged to be adjustable at least in sections in a direction transverse to the displacement direction of the carriage. Thereby, an openable superstructure is advantageously provided in which the longitudinal beam member can be adapted, transversely, preferably perpendicularly to the displacement direction of the carriages, to the corresponding spacing of the carriages, so that play and tolerances are compensated for. In addition, changes in dimensions that occur due to damage or deformation of the substructure can be compensated for. Furthermore, if the folding-top framework is tilted, it can be more easily released by slightly yielding the longitudinal beam members in the direction transverse to the displacement direction. Finally, components from different manufacturers that differ in their tolerances can also advantageously be used.

The longitudinal beam member is expediently an elongated profile, such as a rail, along which the carriages can slide or, if they are provided with rollers, can roll along. The extension of the longitudinal beam member defines the displacement direction of the carriage.

According to a preferred embodiment, it is provided that the guide comprises a support frame in or on which the longitudinal beam member is preferably received. The support frame advantageously limits the mobility of the longitudinal beam member in at least one direction, and is preferably also a bearing for the longitudinal beam member with respect to the mobility of the longitudinal beam member. The support frame can be formed from one part, but it is possible to assemble the support frame from a plurality of parts.

In an advantageous development it is provided that one of the substructure and the longitudinal beam member is connected to the support frame, while the other of the substructure and longitudinal beam member is adjustably coupled to the support frame in a direction transverse and preferably perpendicular to the displacement direction of the carriage. The support frame can thus be realized in two main forms: First, as a part that is firmly (or also movably) connected to the substructure, wherein the support frame then in turn displaceably supports the longitudinal beam member. On the other hand, as a part that is fixedly (or also movably) connected to the longitudinal beam member and is displaceably mounted on the substructure. The support frame can have a load-bearing function in the sense that it absorbs the load of the longitudinal beam member, but does not have to. The support frame can have a framing function in the sense that the longitudinal beam member is framed or edged, but this is also not necessarily the case. Certainly, the two functions do not have to be carried out simultaneously.

In another favorable embodiment, the longitudinal beam member can also be directly beared on the substructure: For example, guide projections can be formed or connected to the substructure or to the longitudinal beam member, which allow a relative displacement of the other part, for example by means of guide recesses. The guide projections can be designed, for example, as cylindrical or prismatic bolts or as dovetail guides, or as a link or link mechanism.

An inexpensive retrofit is obtained when the support frame is adjustably connected to the substructure. In this case, the existing substructure can be used practically unchanged, while the support frame, preferably having the longitudinal beam member connected movably or rigidly thereto, is adjustably connected to the substructure. A simple implementation provides, for example, that entire or partial through bores are made in the substructure and that a bolt of the support frame with the support frame is adjustable in these bores. Alternatively, bolts can also be screwed or welded to the substructure, and the support frame can be adjusted along these bolts. Alternatively, the support frame can also be connected to the substructure via a link mechanism, for example a four-joint arrangement, or a pendulum device, or wedge ramps.

The support frame expediently has a flat base on which the longitudinal beam member preferably rests. However, it is possible to design the base of the support frame in a V-shape, so that the longitudinal beam member is centered under the influence of its mass towards the lowest point of the V-shaped profile.

The support frame is expediently fixed to the substructure or on the longitudinal beam member or formed integrally therewith, for example on the upper edge of a wall of a substructure. Here, the support frame can be screwed to the substructure as well as firmly connected to the substructure in another way, for example by welding or riveting. The support frame expediently forms a limitation on the mobility of the longitudinal beam member at least on one side in at least one direction, but expediently on two sides. In addition, it can advantageously be provided that the support frame also forms a boundary in a further dimension. If the support frame is fixed to the longitudinal beam member, these form a jointly displaceable structural unit, the longitudinal beam member expediently supporting the carriages and introducing its forces into the support frame for displacement the two parts on the substructure.

A particularly favorable embodiment is distinguished in that the support frame is connected to the longitudinal beam member or to the substructure by means of a coupling part which allows a relative movement. In this way, it is advantageously achieved that the coupling part on the one hand connects the longitudinal beam member to the support frame, but on the other hand allows a relative movement in at least one deviation direction of the longitudinal beam member transverse to its main extension.

According to a first preferred embodiment, it is provided that the coupling part is a bolt which is fixed to the support frame and along which the longitudinal beam member is adjustable. Here, the bolt is expediently fixed to the support frame without play, for example riveted or screwed, for example by means of a nut, so that the bolt and the support frame form a structural unit. The longitudinal beam member here has bores through which the bolt passes, the bores being able to be displaced back and forth along the appropriately cylindrical outer circumference of the bolt.

According to a further advantageous embodiment, the coupling part is designed as a link which is hingedly connected to the support frame and hingedly connected to the longitudinal beam member, so that the link connects the support frame to the longitudinal beam member and thus ensures that the longitudinal beam member cannot be carried out of the support frame.

According to a first advantageous embodiment, it is provided that the link is arranged horizontally or in any case extends horizontally and can be pivoted about vertical axes in each case. In this case, the link allows a slight pendulum movement of the longitudinal beam member around the support frame, whereby according to a favorable further development it is provided that at least two links couple the support frame and the longitudinal beam member with each other, so that a kind of parallelogram is provided. Alternatively, an elongated hole penetrated by a pin of the respective other part can also be provided in the longitudinal beam member and/or in the support frame, which additionally centers the adjustment of the longitudinal beam member.

According to a first embodiment, it is provided that the link is arranged horizontally and can be pivoted about vertical axes in each case. In this case, the link is pivotally connected at one end to the longitudinal beam member and other ends to the support frame and allows movement of the longitudinal beam member substantially transverse to the axes, but not in the direction of the axes of the linkage.

According to another embodiment, it is provided that the link is arranged vertically and can be pivoted about horizontal axes on the support frame and on the longitudinal beam member. In this case, the adjustment direction of the longitudinal beam member comprises a vertical and a horizontal component.

According to a further preferred embodiment, it is provided that the coupling part is a projection which is provided on one of the support frame and the longitudinal beam member and is movably inserted in a groove in the other of the support frame and the longitudinal beam member. The projection can be integrally formed with the support frame and/or the longitudinal beam member or alternatively in multiple parts, wherein the connection with the one part is fixed, so that the coupling part designed as a projection is movable in a defined adjustment direction together with the support frame or the longitudinal beam member in the groove of the other part. The projection is expediently provided on the underside of one part, and the groove is expediently provided on the surface of the other part supporting the underside.

According to another advantageous embodiment, it is provided that the coupling part is a rolling element or a slide element provided on one of the support frame and the longitudinal beam member, for example a number of rollers mounted on the longitudinal beam member which can roll on a rolling surface of the support frame, preferably in special tracks, such that the longitudinal beam member can be adjusted in a conveniently horizontal plane and perpendicular to the extension of the support frame and the longitudinal beam member by rolling back and forth in the position thereof.

In a favorable implementation of the openable superstructure, it is provided that the coupling part is a bolt which is fixed to the support frame and which is adjustable with respect to the substructure, in particular through a bore in the substructure. The preferably cylindrical bolt makes possible a simple provision of the adjustment direction, which corresponds to its axis, and can be easily retrofitted. The bolt can also stiffen the support frame and limit the adjustment path with appropriate stops.

In another preferred implementation of the openable superstructure, it is provided that the coupling part is a bolt that is fixed to the substructure. The support frame can then be adjusted with respect to this fixed bolt, for example by means of a bore adapted to the bolt with respect to the support frame and the bolt.

The two aforementioned realizations can also be combined with one another. Instead of a continuous bolt, a plurality, for example two, bolt stubs can also be provided, so that the substructure does not have to be completely drilled through.

According to another preferred embodiment, it is provided that the coupling part is arranged on a nut provided by the support frame and the longitudinal beam member, which nut is axially adjustable on another of a threaded rod, a spindle rod, or a ball screw spindle rod provided by the support frame and the longitudinal beam member. The spindle nut is axially displaced on the threaded rod, spindle rod, or ball screw spindle rod by rotating the threaded rod, spindle rod, or ball screw spindle rod. Alternatively, the nut can also be rotatably mounted on one of the support frame and longitudinal beam member, so that the threaded rod, spindle rod, or ball screw spindle rod is then not provided rotatably. The advantage of this arrangement is, above all, the low force that has to be introduced by the carriage into the longitudinal beam member in order to center it on an ideal adjustment position. It is also possible to assign a drive, for example an electric motor, to the rotatable spindle rod, which supports the displacement of the longitudinal beam member, for example in response to a corresponding sensor system which detects the force which is transmitted from the carriage to the longitudinal beam member. At the same time, when the superstructure is closed, the drive can move the longitudinal beam member into a position in which the tarpaulin is additionally blocked from moving.

It is preferably provided that the coupling part is loaded by at least one pretensioning device in or against a displacement direction of the longitudinal beam member. If the coupling part is designed, for example, as a link coupling the support frame to the longitudinal beam member, the link can be loaded, for example, by a torsion spring around its articulation on one of the two parts, but the coupling part is expediently loaded from both sides, so that substantially a central adjustment position is preset and can be deflected from the central adjustment position by overcoming the pretensioning force.

The longitudinal beam member is expediently fixed or at least sealed at the end thereof in the support frame. This prevents on the one hand that parts penetrate into the space between the longitudinal beam member and the support frame and on the other hand that the longitudinal beam member is centered or at least reduced in its adjustability in the support frame in the end position, so that defined initial positions for the folding-top framework are provided when the superstructure is open or closed.

The support frame preferably includes openings through which water and other free-flowing loadings such as sand, gravel, or other cargo which is brought into the substructure from above and which falls into the region of the support frame instead of into the substructure can be discharged from the support frame. This advantageously prevents the adjustability of the longitudinal beam member from being hindered or blocked by the loading, and moreover, the carriages can be displaced along the longitudinal beam member more reliably.

According to a favorable embodiment, it is provided that the support frame overlaps at least a portion of the longitudinal beam member, so that the longitudinal beam member is prevented from being able to be lifted off the substructure. The longitudinal beam member can also be fixed to the substructure by the coupling part, which prevents the longitudinal beam member from lifting off the substructure. It is possible that there is play between the longitudinal beam member and the support frame, which allows a slight lifting. By preventing the longitudinal beam member from lifting off from the support frame and thus from the substructure, dynamic loads, in particular when driving, for example with a truck superstructure due to the relative wind and other environmental influences and turbulence and which can load the tarpaulin upwards, are reliably prevented.

It is possible to adjustably connect the longitudinal beam member outside of a coupling part to the substructure, a coupling part directly connecting the two parts. For example, the ends of a telescopic guide can each be connected, for example welded, to one of the two parts, and the longitudinal beam member then assumes the optimum distance specified by the carriages. Alternatively, a connection between the longitudinal beam member and the substructure can have a resiliently deformable part, for example a torsion spring, which permits displacement in the y direction against the prestressing of the spring.

According to a favorable embodiment, the support frame is formed, for example, from an extruded steel or aluminum body, but it is also advantageous if the support frame is composed of a plurality of interconnectable section parts, in particular such extruded section parts, so that the support frame is flexible in terms of adaptation to the length of the substructure and/or its lateral side wall.

The longitudinal beam member is also expediently made of a material such as steel or aluminum in the extrusion process and can advantageously be composed of a plurality of interconnectable section parts, the connection of the section parts being so stable that the section parts do not break apart or are adjusted differently when the longitudinal beam member is adjusted.

According to a particularly advantageous embodiment, it is provided that the longitudinal beam member is prestressed into an initial position by at least one spring element. The spring element represents an additional resistance to the adjustment of the longitudinal beam member transverse to the displacement direction of the carriage, so that the longitudinal beam member is prestressed into a preferably central adjustment position as the initial position. In this case, the load on the longitudinal beam member can be carried out directly, for example by a leaf spring which is supported against the support frame and loads the longitudinal beam member away from a wall of the support frame, or indirectly, for example via a coupling part or a projection of the longitudinal beam member. The spring element is expediently made of steel as a helical spring and clamped at discrete intervals between the longitudinal beam member and substructure or support frame, but it is also possible to provide a continuous spring member such as a leaf spring. Alternatively, a plastic buffer can also form the spring element, the plastic buffer being able to be arranged continuously between the longitudinal beam member and the substructure or support frame. If the longitudinal beam member pivots or swings around the substructure or the support frame in a pivoting or pendulum movement, a torsion spring can also be selected for the prestressing.

According to a particularly favorable embodiment, a torsion spring is already provided instead of a link, so that the coupling device designed as a torsion spring simultaneously realizes the coupling of the support frame and the longitudinal beam member as well as the adjustment of the longitudinal beam member to a preferred adjustment position.

A spring element is expediently arranged on both sides of the longitudinal beam member, the spring elements prestressing the longitudinal beam member in a direction of a presettable initial position of the adjustment position. By providing spring elements on both sides of the longitudinal beam member, the longitudinal beam member can be prestressed into a central position, where it is not in contact with a stop, so that a movement in two directions is possible.

Preferably, the adjustment direction of the longitudinal beam member transverse to the displacement direction of the carriage comprises a horizontal component, in particular if it is a superstructure which closes the substructure upwards, the adjustment direction preferably running only in a horizontal direction perpendicular to the displacement direction of the carriages. If the superstructure is a side wall, then the adjustment direction (belonging to the displacement direction of the carriage) substantially comprises a vertical component. The displacement direction of the carriages on the one hand and the adjustment direction of the longitudinal beam members on the other hand preferably span a plane in space that corresponds to the opening of the substructure to be closed.

If the adjustment movement of the longitudinal beam member carries out a pivoting or pendulum movement, the horizontal component and the vertical component overlap, so that the corresponding displacement movement results from these two components.

According to a particularly favorable embodiment, it is provided that two carriages, which are opposite each other with respect to a plane bisecting the substructure in the longitudinal direction, are coupled to one another by a strut. This strut, which is equipped with a carriage on each end, then travels with each of the two carriages on a longitudinal beam member in the displacement direction for opening and closing the openable superstructure. The strut is preferably rigid, so that the two carriages define a distance practically without tolerance to one another, which specifies the distance between the two longitudinal beam members.

According to a favorable further development, the strut is selected from the group comprising a tarpaulin hoop, a roof-shaped hoop, a rigid U-shaped bow, and a movable U-shaped bow. The hoop and the rigid U-shaped bow, which is used, for example, in sliding-bow folding tops, hardly allow any deformation in the direction in which the pair of opposite longitudinal beam members are spaced apart and which is preferably also the adjustment direction of the longitudinal beam member. A less robust and therefore movable U-shaped bow, on the other hand, yields due to the force with which the longitudinal beam members are centered.

The force for displacing the longitudinal beam member is expediently dimensioned less than the force for elastic and/or plastic deformation of the strut. This ensures that it is not the strut or the carriage that is deformed elastically or plastically, but rather the longitudinal beam member is adjusted, in particular against the pretensioning of a corresponding spring member that prestresses the longitudinal beam member into a preset adjustment position. It is hereby advantageously achieved that the longitudinal beam member follows the strut with the carriages connected to it, the carriages introducing the force for the adjustment of the longitudinal beam member into the longitudinal beam member. If the substructure or the carriage has been plastically deformed, this means that the distance between the longitudinal beam members forming the guide must be changed in order to allow the carriages to simply roll or slide on the longitudinal beam members; this is achieved in that the longitudinal beam members are adjusted in a direction transverse to the displacement direction of the carriage.

According to a favorable embodiment, it is provided that the longitudinal beam member is elastically deformable. If the longitudinal beam member can be deformed elastically, it can, if it is clamped at the end, take exactly the position required for adaptation to the distance of a pair of carriages assigned to a strut, the force for adjusting the longitudinal beam member being generated from the internal stress of the longitudinal beam member.

According to a preferred development, it is provided that the longitudinal beam member has at least one track for a support roller of the carriage that absorbs vertical forces and at least one track for a guide roller of the carriage that absorbs horizontal forces. The support roller is expediently mounted about a horizontal or at least predominantly horizontal axis, the guide roller in this case being mounted about a vertical or at least predominantly vertical axis. The guide roller substantially transmits the force with which the longitudinal beam member is adjusted. It is expediently provided that both the support roller and the guide roller are mounted about axes which have a vertical component and a horizontal component, so that if it is further provided that the longitudinal beam member is acted upon from both sides with respect to its adjustment direction, both a pull movement as well as a push movement can be introduced into the longitudinal beam member.

According to a first advantageous embodiment, the folding-top framework is designed as a sliding-bow folding top which is movable along a pair of opposed longitudinal beam members. The sliding-bow folding top has substantially upside-down U-shaped struts which have a carriage at the end, which are displaceable on a longitudinal beam member, respectively. The U-shaped struts are very stable because they have a voluminous superstructure and can therefore hardly be deformed in a direction transverse or perpendicular to the displacement direction of the carriages. In this case, the longitudinal beam members can advantageously be adapted to the dimensions of the struts of the sliding-bow folding top.

According to another preferred embodiment, it is provided that the folding-top framework is designed as a sliding roof that is movable along two longitudinal beam members supported by side superstructures, such as stanchions or rigid side walls. In the case of a configuration as a sliding roof, the struts connecting the carriages are elongated, or roof-shaped, or U-shaped, but only allow a slight yielding in the direction transverse or perpendicular to the displacement direction of the carriages, so that the longitudinal beam member adjusts to the dimension of the carriages spaced apart from the strut.

According to another preferred embodiment, it is provided that the folding-top framework is designed as a movable side wall which is movable along two longitudinal beam members arranged one above the other. In this case, taking into account the weight of the mass of the folding-top framework, the pretensioning of the longitudinal beam members must be set, so that substantially a spring support against the force of gravity is expedient.

If both a roof opening and a side opening are to be closed on a substructure, a first adjustable longitudinal beam member for the upper opening and a second adjustable longitudinal beam member for the side opening can be provided on a part of the folding-top framework, which can be adjusted independently of one another, since they are assigned to two independent covers. Nevertheless, the longitudinal beam members can be used in an adjustable manner in a common support frame, which is supported, for example, via stanchions against a loading platform of the substructure.

According to a favorable embodiment, it is provided that tarpaulin folding aids are connected on carriages, which lift a tarpaulin connected to the folding-top framework or fold it. The tarpaulin folding aids form a knee, the opening angle of which decreases when the carriages are moved together, so that the tarpaulin is lifted and folded.

According to an alternative embodiment, adjacent carriages with respect to the longitudinal beam member can be coupled to one another via a hinge arrangement which, when the superstructure is closed, assumes its maximum extension. Here, the hinge arrangement can both lift rigid parts and lift parts designed as a tarpaulin.

Cover plates are expediently hingedly connected to the carriage and form a closed cover when the superstructure is closed and can be folded in a concertina-like manner when the superstructure is open. For this purpose, the cover plates which are in each case hingedly connected to the carriage are also hingedly connected to one another in pairs, so that the cover formed from the cover plates can be folded up. In the same way, an openable and at the same time rigid roof or side opening of the substructure can be covered, the cover plates having a high level of rigidity and it being correspondingly expedient if the longitudinal beam member yields.

Expediently, the force for the adjustment of the longitudinal beam members is transmitted by the displacement of the carriages along the longitudinal beam members, so that the longitudinal beam member is adjusted to the desired track width by the carriages and the struts connecting the carriage in pairs. In this way, manufacturing tolerances and the like can also be compensated for.

The folding-top framework can be operated manually for opening and closing, the rigid design of the folding-top framework making it possible for the force for moving the carriages along the longitudinal beam members to be also one-sided, for example by pulling on a loop coupled to the foremost carriage. However, it is particularly preferred if the displacement of the carriage takes place by a motor drive, which benefits in a particularly advantageous manner from the fact that the longitudinal beam members can adapt their position to the carriages being displaced.

In an advantageous embodiment, the superstructure distinguishes in that the longitudinal beam member is infinitely adjustable in the adjustment direction, which is transverse and preferably perpendicular to the displacement direction of the carriage, which is also the main extension direction of the longitudinal beam member. The adjustment is free of interlocks and is possible without a previous unlocking process. To this extent, the longitudinal beam member can follow the folding-top framework of the sliding roof at any time in a favorable manner, without the need for manual adjustments. The two opposite longitudinal beam members always follow the folding-top framework and any external influences, so that the superstructure always has to overcome only a slight resistance when opening or closing.

It is expediently provided that the adjustment direction of the longitudinal beam member is perpendicular to the displacement direction of the carriage. The adjustment movement of the longitudinal beam member is infinitely possible. Although the adjustment path of the longitudinal beam member is limited, for example, by end stops, the adjustment position of the longitudinal beam member is free, however, it cannot and does not have to be blocked or locked for a functioning floating adjustment.

The adjustment direction of the longitudinal beam member and the displacement direction of the carriages preferably span a plane which corresponds to a plane of the opening of the substructure which is to be closed by the superstructure.

The substructure includes, in particular, fixed walls, as is the case, for example, with a tipping body or a fixed housing. The fixed walls are generally suitable for supporting superstructures, but if the folding-top framework is also very rigid, the advantages of a floating adjustability of the longitudinal beam member are particularly important.

The adjustability of the longitudinal beam member therefore does not include, for example, a locking or fixing of the longitudinal beam member; rather, the longitudinal beam member can be adjusted at any time without having to assume a specific adjustment position.

According to an aspect of the invention, a commercial vehicle, a building, a container, or railway wagon is provided which contains an openable superstructure as described above. Despite the very stable design of both the substructure and the openable superstructure, the longitudinal beam member, which is adjustable in the transverse direction to the displacement direction of the carriages, ensures comfortable and reliable operation, opening, and/or closing of the superstructure.

The substructure, which is to be equipped with an openable superstructure, is expediently a trough-shaped construction, such as a leakage tub for containers, a concrete tub, a silo, a sand or gravel bunker, or a garage. The superstructure protects the construction against precipitation in particular. If, for example, a free-flowing material, such as seeds or gravel, is to be introduced into the trough-shaped construction, the superstructure is opened so that a dumper truck can enter the construction and is able to dump the material. Afterwards, the superstructure or the sliding roof is closed again, so that there is no permanent contamination with dusts, plant spores, or precipitation. For such trough-shaped constructions, there have so far been no openable superstructures suitable for continuous operation. It is now also possible to retrofit existing constructions with openable superstructures.

According to an aspect of the invention, a method for displacing an openable superstructure, in particular an openable roof, an openable side wall or an openable cover is specified, in which a first guide element and a second guide element are arranged on a substructure, in which parts of a framework of the superstructure can be displaced along one of the guide elements in a primary displacement direction in order to open or close an opening in the substructure, the method distinguishing in that the guide elements are displaceable independently of one another transversely to the primary displacement direction in a deviation direction which is preferably perpendicular to the displacement direction or at least contains a component perpendicular thereto. The method advantageously makes it possible to compensate for tolerances in the manufacture of the framework or the parts of the framework, temperature-related tolerances resulting from thermal expansion, and undersized and oversized dimensions resulting from bumps, dents, and other damage to the substructure, so that the folding top can also be opened or closed in case of severe deformation or impairment of the substructure or frame with little effort and so that at the same time a reliable covering of the substructure is achieved.

The displacement of the parts of the framework, in particular the carriages, in the primary displacement direction expediently results in the displacement of the guide elements in the deviation direction so that tolerances due to the distance between the first guide element and the second guide element can be compensated for.

The first and the second guide element therefore define, on account of their deviation movements which are movable in a substantially parallel direction, an in principle infinite number of possibilities for permitting the displacement of the parts of the framework, so that, due to the temperature of the loading, the type of loading, the weight of the loading, or the dynamic forces acting of the substructure, an opening of the substructure can always be opened or closed with little effort.

Further advantages, properties, developments, and refinements of the invention result from the following description of preferred embodiments and from the dependent claims.

The invention is explained below with reference to the accompanying drawings using preferred embodiments.

Figure 1:
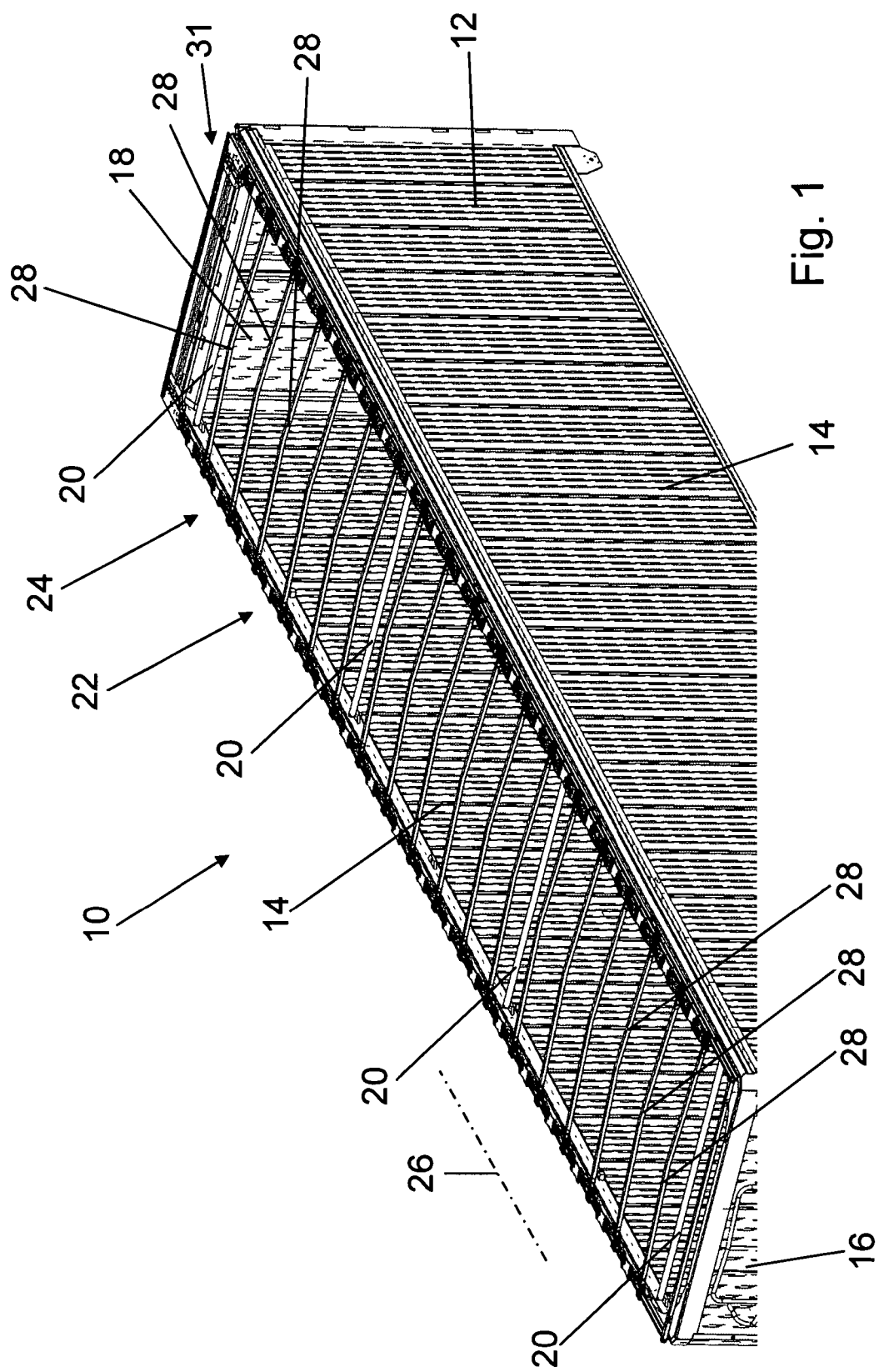
FIG. 1 shows a perspective view of a preferred embodiment of an openable superstructure according to the invention.

FIG. 1 shows an openable superstructure, generally designated 10, which is designed as a sliding roof for a semitrailer forming a substructure. The substructure 12 comprises two rigid side walls 14, a rigid end face 16 perpendicular thereto, and a rear side 18 containing two openable rigid doors, all of which are constructed on a floor surface of the substructure. The substructure 12 is overall very stiff, which is favorable for loads to be transported since the substructure transfers static and dynamic loads well. It can be seen that the opposite side walls 14, which can also be designed to be openable, are additionally braced together with stiffening rods 20 in order to stabilize the substructure in its upper region as well.

The roof region, which forms an opening enclosed from the side walls 14, the end wall 16, and the rear wall 18, is covered by a sliding roof, designated overall by 22, which is formed from a folding-top framework 24 and a tarpaulin 26 attached to it, indicated only by dash-dotted lines. The folding-top framework 24 comprises a plurality of struts 28 configured as a rigid hoop, each of which is connected at the end to a carriage 30 by means of riveting, the carriage 30 being displaceable along a guide which comprises a longitudinal beam member 32.

At its openable end, the folding-top framework 24 is equipped with an end run part 31 which substantially comprises two struts 28 having carriages 30 connected to them, the struts 28 or the adjacent carriages 30 being connected with a connecting rod to form a rigid part. When opening the superstructure 10, the end run part 31 runs over the entire length of the guide or the longitudinal beam member 32 and successively pushes the further carriages in front thereof when opening. The end run part 31 is very rigid, since it must transmit a tensile force introduced from one side to the entire framework and at the same time tilting should be avoided.

Adjacent carriages 30 are each connected to one another by a tarpaulin folding device 34 which is designed as a folding plate and is hingedly connected to the carriage 30 about an axis 34a, the tarpaulin folding device 34 having a flexible central portion 34b which allows the folding of the tarpaulin folding device 34 in a knee-like manner when bringing together the carriages 30. The tarpaulin 26 is fastened to the carriage 30 and/or to the struts 28 and at the same time is guided over the flexible region 34b of the tarpaulin folding device 34, so that the tarpaulin 26 is folded in a concertina-like manner when adjacent carriages 30 are brought together along the longitudinal beam member 32.

It is possible, with respect to a longitudinal bisector of the substructure 14, that is to say that plane which runs centrally between the opposite side walls 14, to provide a joint with an optional lifting hoop instead of the flexible region, which additionally raises the tarpaulin 26. It is also possible to equip the sliding roof 22 only with lifting hoops and to omit the struts 28 for this purpose. It is also possible to design the folding plates 34 provided as a tarpaulin folding aid in such a way that they extend over the entire width of the superstructure 10 and, if appropriate, are also additionally fixed to the struts 28, so that substantially a roof consisting of rigid parts is formed. In this case, instead of the flexible point 34b, a hinge arrangement is provided, which allows the corresponding plates to be folded up, with an overlap then expediently in the closed state of the superstructure 10 in order to prevent rain or the like from penetrating into the interior of the substructure 12. Furthermore, it is alternatively possible that instead of a strut 28 substantially forming a line, the strut is U-shaped, so that the superstructure not only covers the substructure 12 at an opening, but also overbuilds it.

The longitudinal beam member 32 is composed of a plurality of section parts 32a, 32b (see FIG. 2) which are connected to one another at the end. Bores 36 are provided in the longitudinal beam member 32, which run perpendicular to the extension of the longitudinal beam member 32 and are provided for connecting the longitudinal beam member 32 to a support frame 38. The longitudinal beam member 32 and the support frame 38 together form a guide for the carriage, wherein, as will be explained further below, the carriage is displaceable in its displacement direction (x direction) along the longitudinal beam member 32, and the longitudinal beam member 32 is adjustable on the support frame 38 in a direction transverse thereto.

Figure 3:
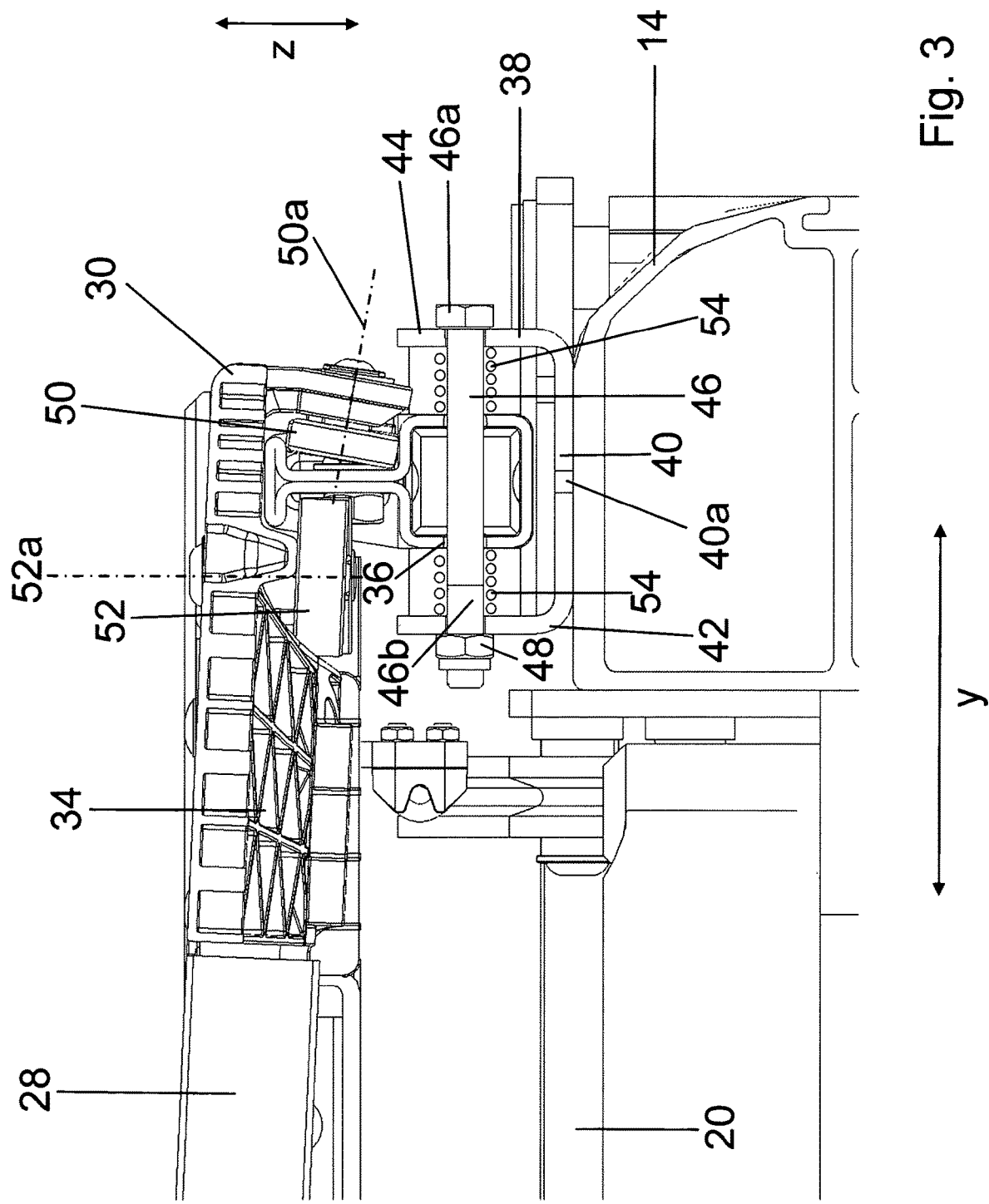
FIG. 3 shows a cross section through the superstructure of FIGS. 1 and 2.

In FIG. 3, it can be seen that the longitudinal beam member 32 has a substantially square lower profile portion, from which a substantially T-shaped upper portion extends in the center. The bore 36 penetrates the two vertical walls of the square portion. On both side walls 14, such a guide consisting of a support frame 38 and a longitudinal beam member 32 is provided at the top.

The support frame 38 is also formed from a plurality of support frame pieces 38a, 38b, which may, but need not, be axially connected to one another, the support frame pieces 38a, 38b being fastened to the upper side of the side wall 14 of the substructure 12. It is possible that the support frame 38 is already formed integrally with the side wall or the substructure. The support frame 38 has a base portion 40, which contains a bore 40a, with which the support frame 38 can be screwed to the side wall 14. On its inner side, that is to say the side facing the interior of the substructure 12, the support frame 38 has a continuous, substantially vertical wall 42, so that the support frame 38 has a substantially L-shaped profile. At specific points on the support frame 38, in particular at the end of the support frame portion 38a, 38b, a fold 44 is formed which is aligned parallel to the wall or portion 42. The side walls 42 and 44 limit the lateral movement of the longitudinal beam member 32 in the manner of stop surfaces. Instead of the folds 44, it is also possible to provide a continuous leg corresponding to the wall or the leg 42. The region between adjacent folds 44 forms an opening through which rain or fallen parts of the loading can be led out. It is also possible to provide further openings in the base 40 if these then lead out into the region outside the loading space. It is also possible to design the support frame as an integral or multi-part part of the side wall 14.

A thread bolt 46 having a head 46a and a threaded portion 46b is guided through bores 44a, 42a of the legs 44, 42 and is fixed to the support frame 38 by a nut 48. The thread bolt 46 also passes through the bore 36 of the longitudinal beam member 32 and thus forms a coupling part for connecting the support frame 38 to the longitudinal beam member 32, whereby the bolt 46 defines a guide for a relative movement of the longitudinal beam member 32 transverse to the direction of extension of the support frame 38 and of the longitudinal beam member 32. This advantageously ensures that the longitudinal beam member 32 can only be displaced in a horizontal deviation direction y perpendicular to the displacement direction x of the carriage. At the same time, the bolt 46 ensures that the longitudinal beam member 32 cannot be lifted from the support frame 38 and thus from the side wall 14, so that the sliding roof 22 as a whole is fixed to the substructure 12 despite the displaceability of the longitudinal beam member 32.

It can be seen that the carriage 30 is connected to the upper T-shaped profile of the longitudinal beam member 32 via a predominantly vertically arranged support roller 50 rotatable about a horizontal axis 50a and a guide roller 52 rotatable about a predominantly vertical axis 52a, the support roller 50 being predominantly on an outer upper surface of the square lower profile part of the longitudinal beam member 32 and prevented from lifting upwards by the cross stroke of the T-shaped profile, while the guide roller 52 rolls off substantially on the upstroke of the T-shaped profile. Because both rollers 50, 52 have an inclination both against the vertical and against the horizontal, these forces can be introduced both in the y direction and in the z direction, so that the folding top is supported in the z direction—predominantly by the support roller 50—while the longitudinal beam member 32 is displaced along the bolt 46 in the y direction. Two guide rollers 50 and two support rollers 52 are arranged on the carriage 30.

It can be seen that on the bolt 46 in the intermediate region between the legs 42, 44 on the one hand and the lower profile portion of the longitudinal beam member 32 on the other hand a spring element 54 configured as a helical spring is arranged, which together prestress the longitudinal beam member 32 into a substantially centered adjustment position, but allow the adjustment of the longitudinal beam member along the bolt 46 when applying a force that overcomes the force of the spring member 54 and is introduced from the outside.

If the folding-top framework is now opened or closed, the carriages 30 with the rigid end run part 31 are displaced along the longitudinal beam member 32, with the spacing predetermined by the folding-top framework 24 leading to the adjustment of the longitudinal beam members 32 due to the rigid design of the struts 28 via the rollers 50, 52 along the bolts 46 such that they are adjusted to an optimal adjustment position with respect to the folding-top framework 24. If, for example, the substructure 12 is placed on an inclined surface, this can already influence the optimal position of the longitudinal beam member 32. If the substructure 12 is also still damaged or bulges due to a loading or is thermally expanded due to the temperature of the loading, the adjustability of the longitudinal beam member 32 can overcome an otherwise occurring blockage, so that the superstructure can then be opened and closed and neither jamming nor tilting of the folding-top framework takes place on the guide or on the two longitudinal beam members 32.

Figure 2:
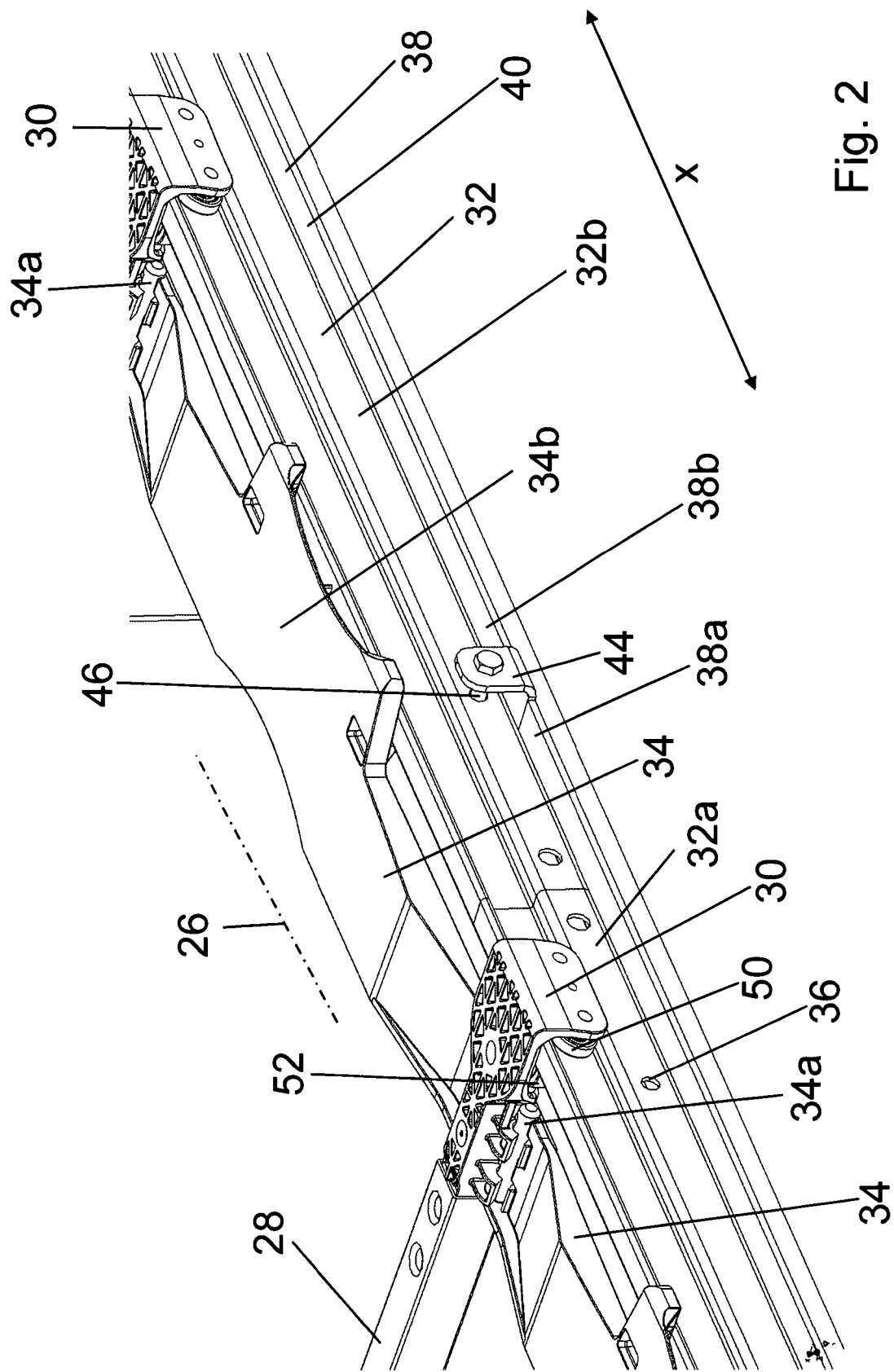
FIG. 2 shows an enlarged cutout of the superstructure from FIG. 1.
Figure 4:
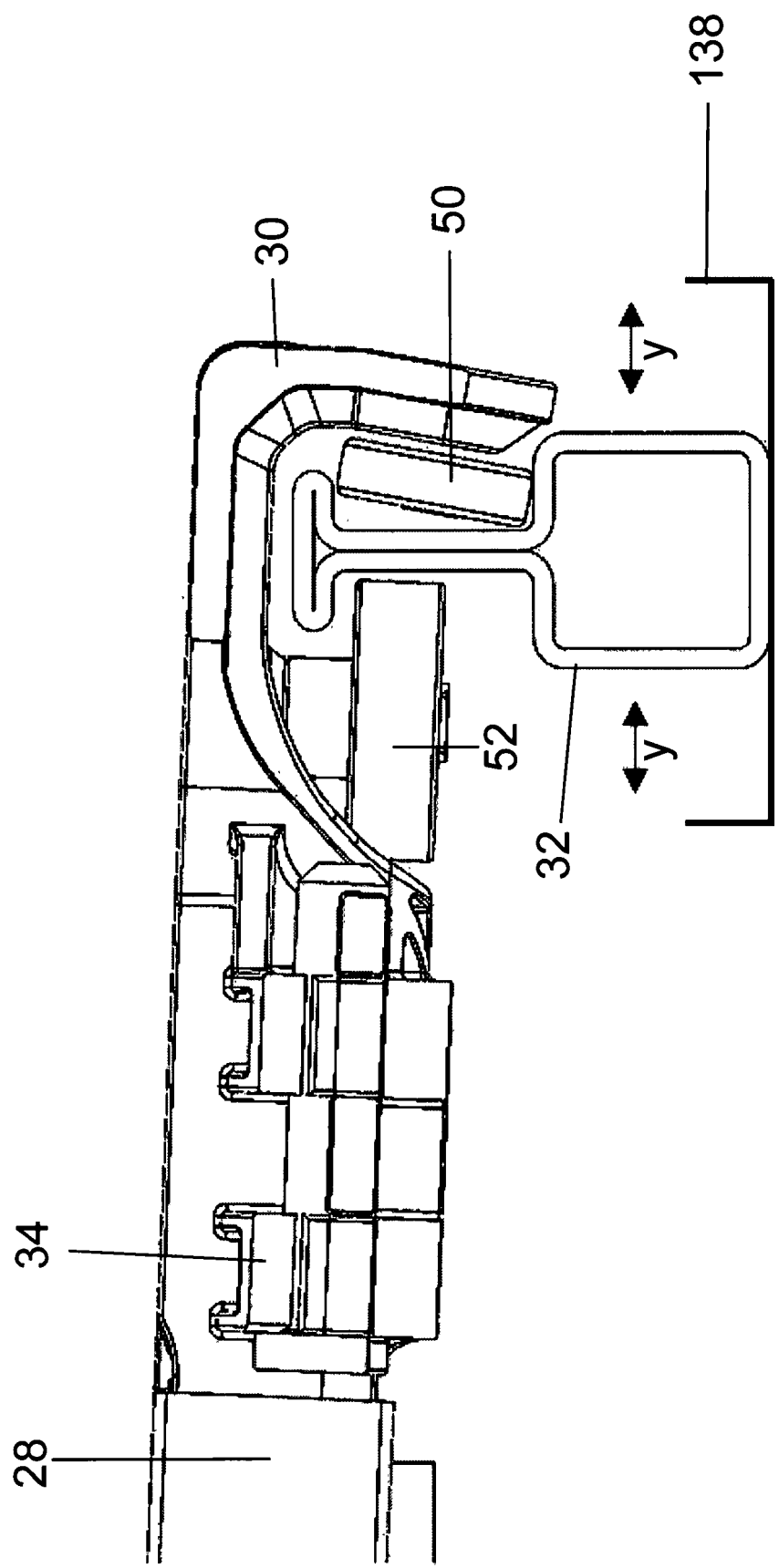
FIG. 4 shows a cross section through an alternative embodiment of a superstructure.

An alternative embodiment is described in FIG. 4, the same reference numerals as in the embodiment according to FIGS. 1 to 3 denoting the same or structurally comparable parts.

In contrast to the previous embodiment, the longitudinal beam member 32 is not coupled to the support frame 138 via a bolt, but rests on the support frame 138. Here, a coupling member is provided between the support frame 138 and the longitudinal beam member 32 such that the longitudinal beam member 32 cannot be lifted vertically. Such a coupling member can be, for example, a bolt extending the longitudinal beam member 32 downward through a bore, which is caught and secured in an elongated hole in the y-direction of the support frame 138. It can also be seen that the support frame 138 is U-shaped in cross section, so that its legs also form stop surfaces for the displacement of the longitudinal beam member 32.

Figure 5:
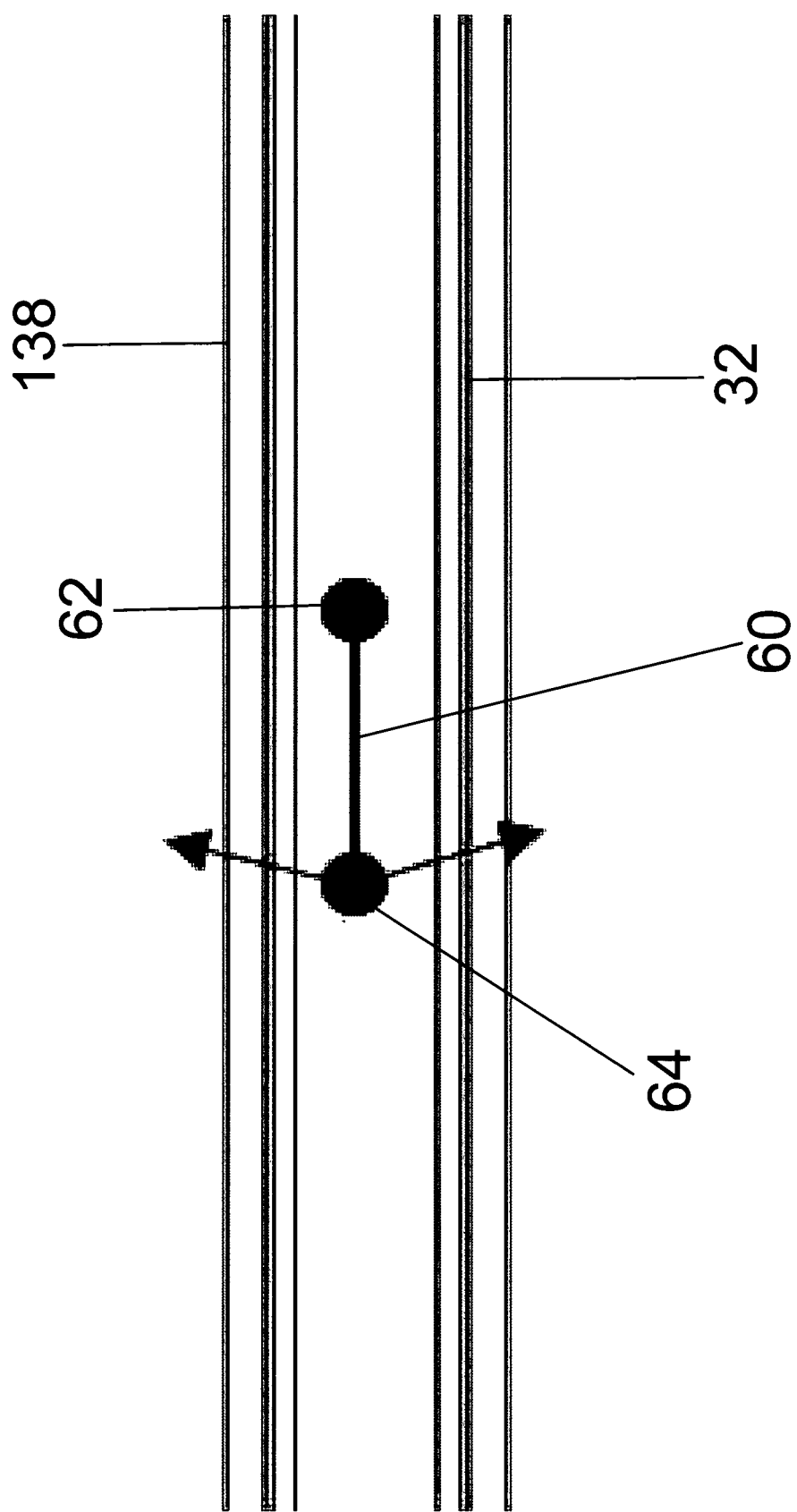
FIG. 5 shows a schematic plan view of an alternative embodiment of a superstructure.

FIG. 5 shows a modification of the embodiment according to FIG. 4 in a top view, the U-shaped support frame 138 receiving the longitudinal beam member 32. In this case, a coupling part 60 configured as a link is pivotally mounted in the base of the support frame 138 in a joint 62, while the other end of the link 60 is pivotally mounted in the underside of the longitudinal beam member 32 in a joint 64. The link 60 also connects the longitudinal beam member 32 to the support frame 138 and prevents the longitudinal beam member 32 from being lifted off upwardly. As a result, it is not necessary for the support frame 138 to overlap the longitudinal beam member 32. At the same time, the double articulation of the link 60 about the axes 62 and 64 makes possible the displacement of the longitudinal beam member 32 in an adjustment direction that extends largely in the y direction, wherein a respective first link 60 in the front region of the longitudinal beam member 32 and a second link 60 in the rear region of the longitudinal beam member 32 are provided, which together with the support frame 138 and the longitudinal beam member 32 span a parallelogram. The proportion of the adjustment of the longitudinal beam member 32 in the x-direction of the displacement of the carriage 30 is small because of the small angles that the link 60 can take.

Figure 6:
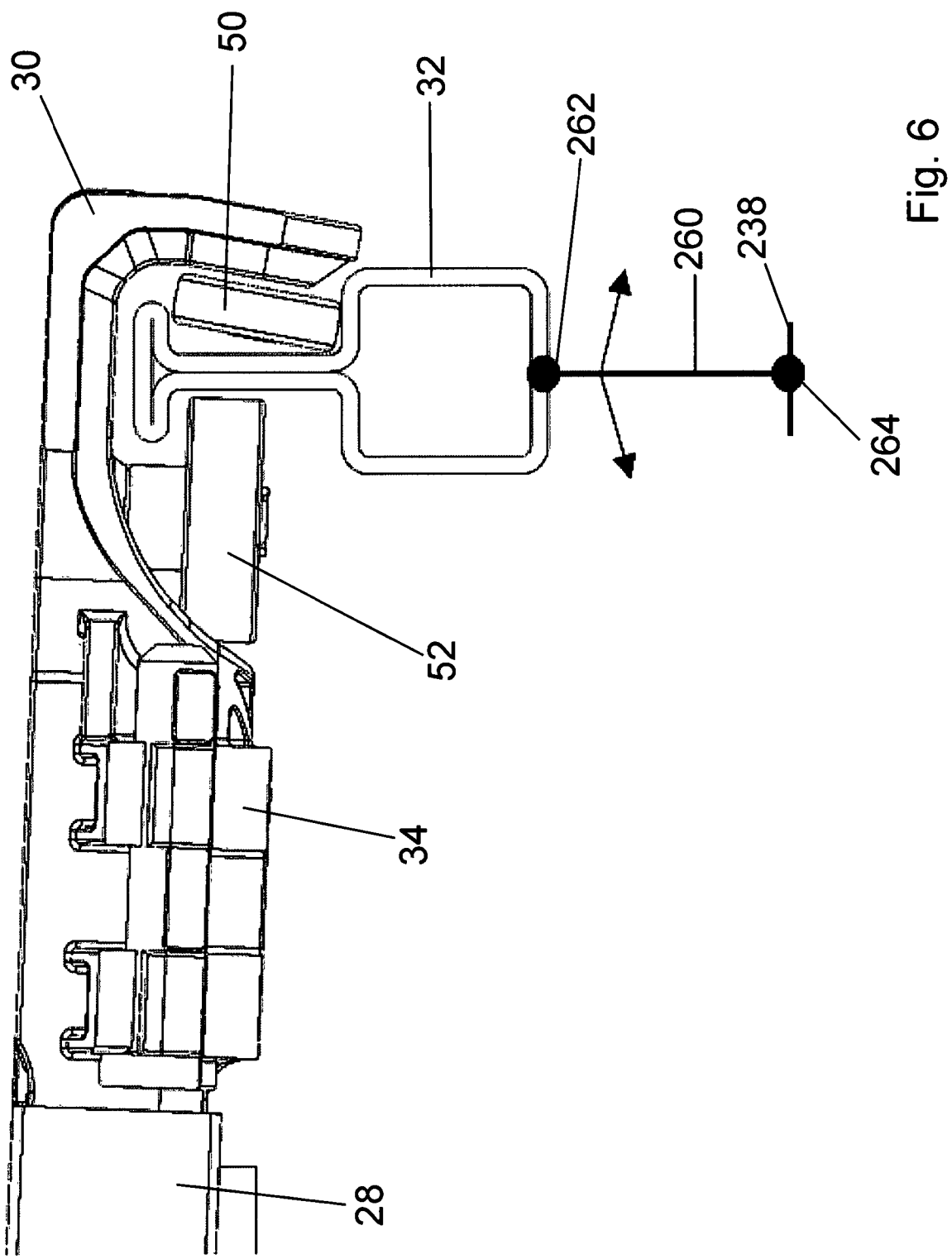
FIG. 6 shows a cross section with an alternative embodiment of a superstructure.

FIG. 6 shows an alternative embodiment in which the same reference numerals as in the embodiment according to FIGS. 1 to 3 designate the same or structurally comparable parts.

In contrast to the embodiment according to FIG. 5, the longitudinal beam member 32 is coupled to the support frame 238 via a link 260, which is articulated substantially about a horizontal axis 262 on the longitudinal beam member 32 and about a horizontal axis 264 at the base of the support frame 238, and extends predominantly vertically. The link 260 thus makes possible the adjustability of the longitudinal beam member 32, predominantly in the y direction and to a specific extent in the z direction. At the same time, the link 260 also connects the longitudinal beam member 32 to the support frame 238 and thus prevents the longitudinal beam member 32 from being lost due to lifting. It is expediently provided here that the pivoting angle of the link 260 is only as large as is necessary for the adjustment of the longitudinal beam member 32, for example by side legs of the support frame 238 or stop surfaces provided on the support frame 238. The link 260 can also be made very short. Since the central adjustment position of the longitudinal beam member 32 is also the most raised position, the lower side of the longitudinal beam member 32 can be prestressed into the middle position with a spring member, which rests on the base of the support frame 238, so that this spring member must be tensioned, if the longitudinal beam member 32 is to be adjusted from the middle position. A spring member then forms the resistance for deflection in both directions.

Figure 7:
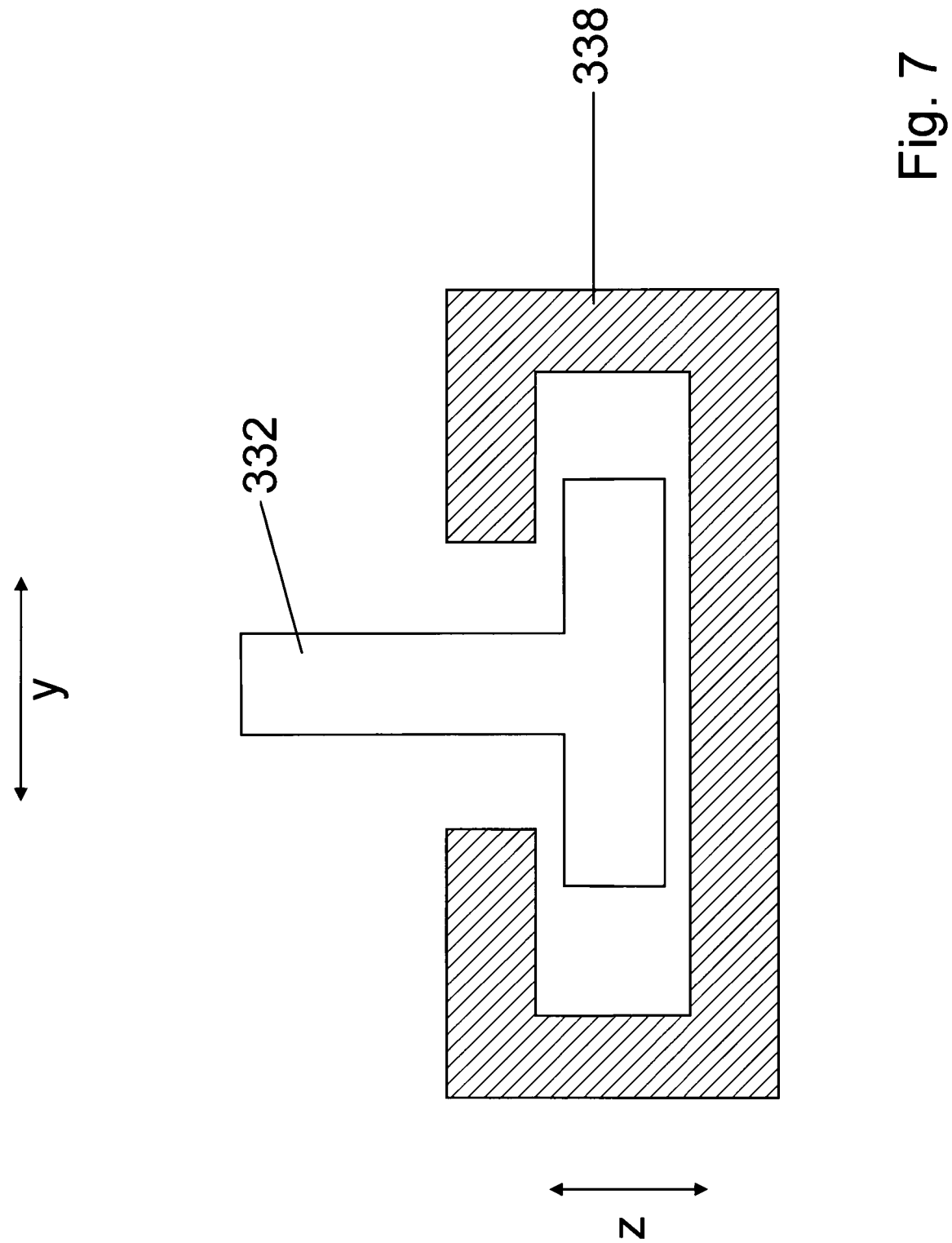
FIG. 7 shows a schematic cross section through part of a modified superstructure.
Figure 8:
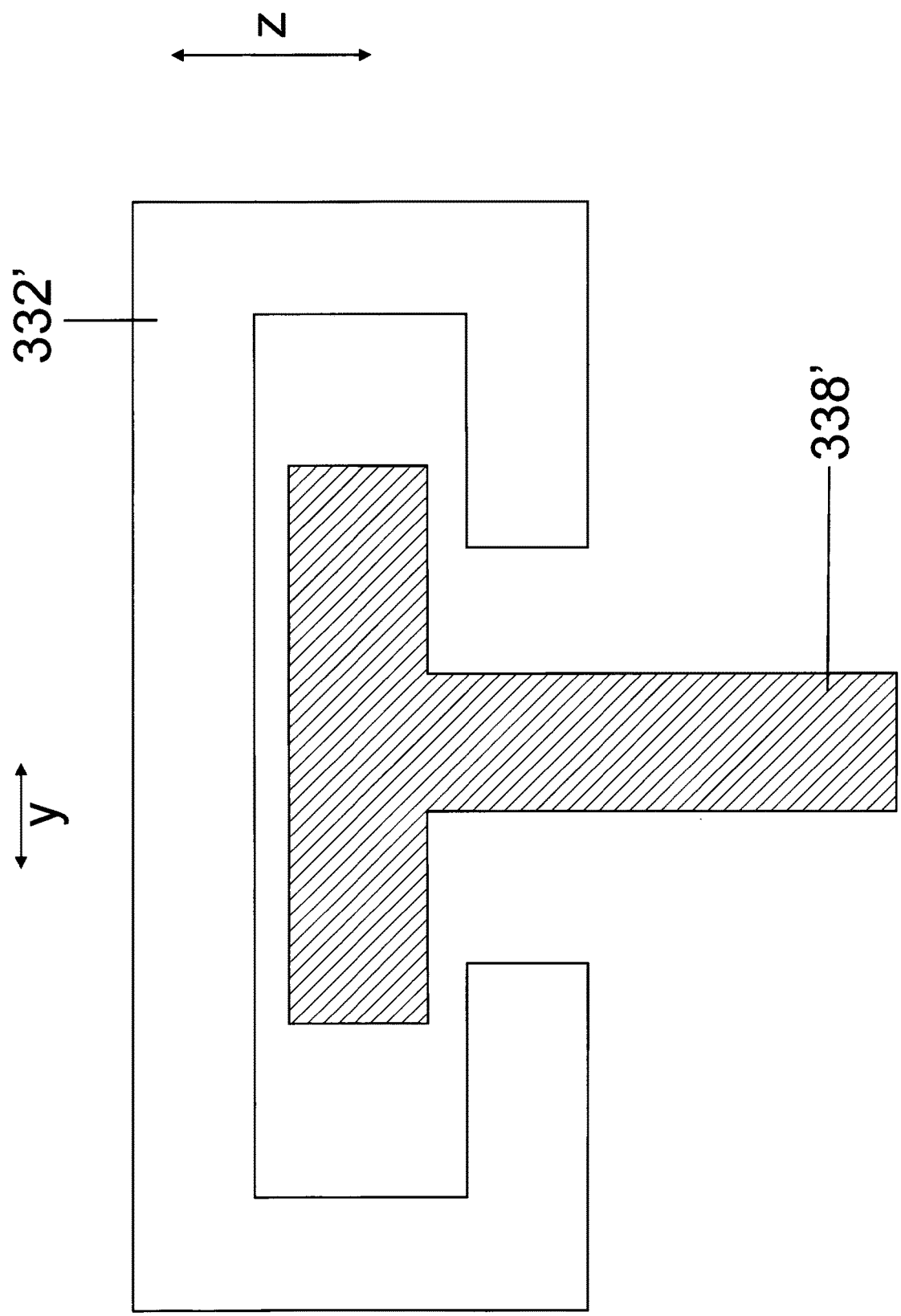
FIG. 8 shows a cross section through another modified superstructure.

FIG. 7 and FIG. 8 show schematically that there are different ways to couple the support frame 338, 338' and the longitudinal beam member 332, 332' so that the longitudinal beam member 332, 332' is adjustable in the y direction, and cannot be lifted off in z direction. Here, it is not necessary to realize the support frame 338 as the part encompassing the longitudinal beam member 332 as shown in FIG. 7; it is also possible to encompass the longitudinal beam member 332' around the support frame 338'. It can be seen that any profiles can be connected to the longitudinal beam member 332, 332', which can be designed for the displacement of a wide variety of carriages, and that a wide variety of covers can also be provided. If, for example, the guide roller is arranged between two walls of a chamber of the longitudinal beam member 332, this can transmit a force in the y direction to the longitudinal beam member 332 without the guide roller having to transmit forces in the y direction.

Figure 9:
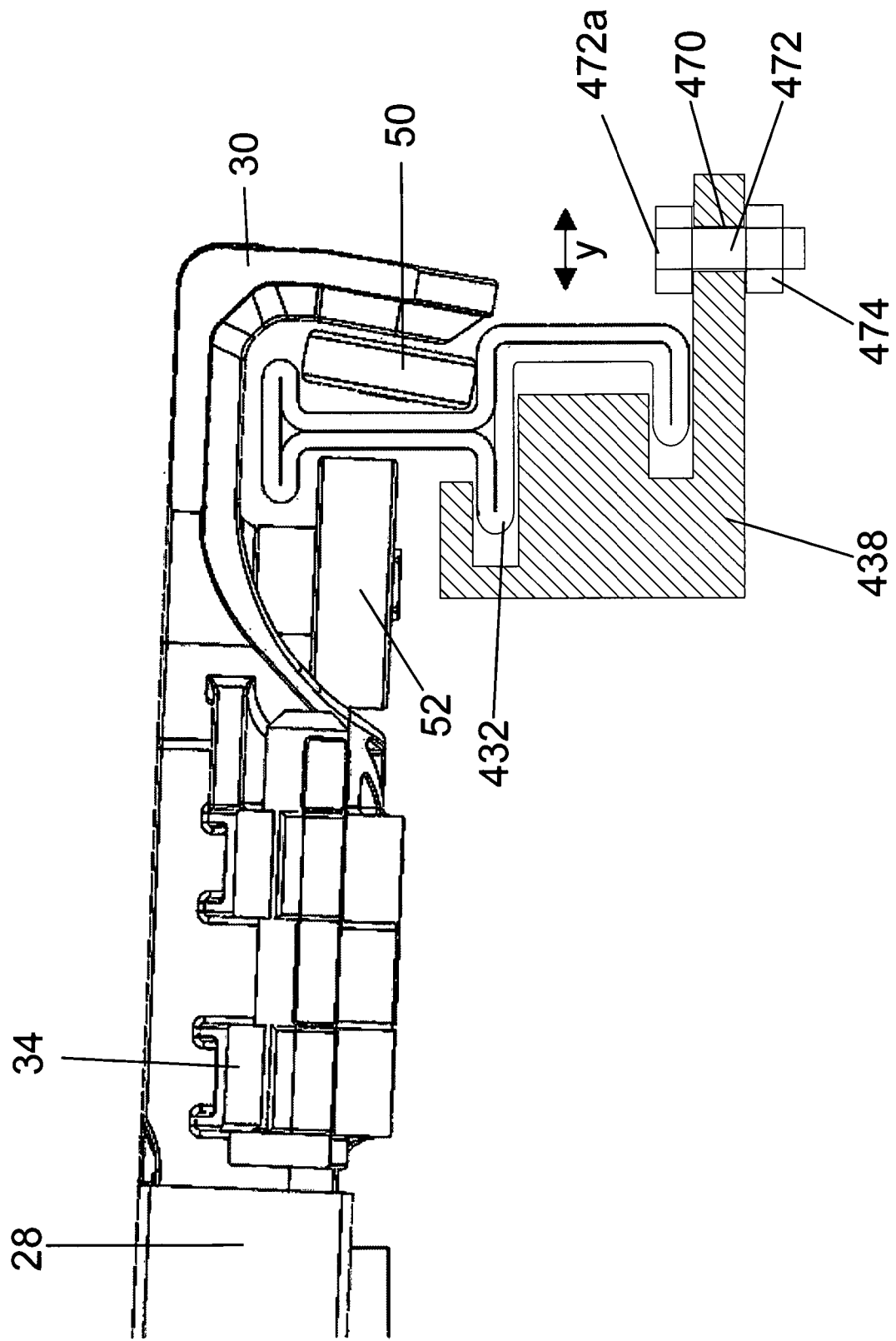
FIG. 9 shows a cross section through a further alternative embodiment of a superstructure.

FIG. 9 shows a further embodiment, the same reference numerals as in the embodiment according to FIGS. 1 to 3 denoting the same or structurally comparable parts.

In contrast to the embodiment according to FIGS. 1 to 3, the longitudinal beam member 432 is configured such that, even after the substructure 12 has been completed, it can be pushed into a complementarily shaped support frame 438 from the side, in this case from the outside. For this purpose, the support frame 438 is open on one side and has bores 470 which, after the insertion of the longitudinal beam member 432, are penetrated by a bolt 472 with a head 472a and can be fixed to the support frame 438 with a nut 474. The head 472a forms an outer stop for the displacement of the longitudinal beam member 432 in the y direction, while the support frame 438 forms an inner stop for the displacement of the longitudinal beam member 432 in the y direction. It is not necessary to provide spring members for prestressing the longitudinal beam member 432.

The advantage of the embodiment according to FIG. 9 lies primarily in the fact that the longitudinal beam member 432 does not have to be inserted axially into the support frame 438, which can be difficult because of the narrow tolerances and the deflection, but that it can be inserted from the outside. This is much more effective if only a section part of the longitudinal beam member 432 is to be replaced. At the same time, water and dirt can be easily discharged to the outside.

Figure 10:
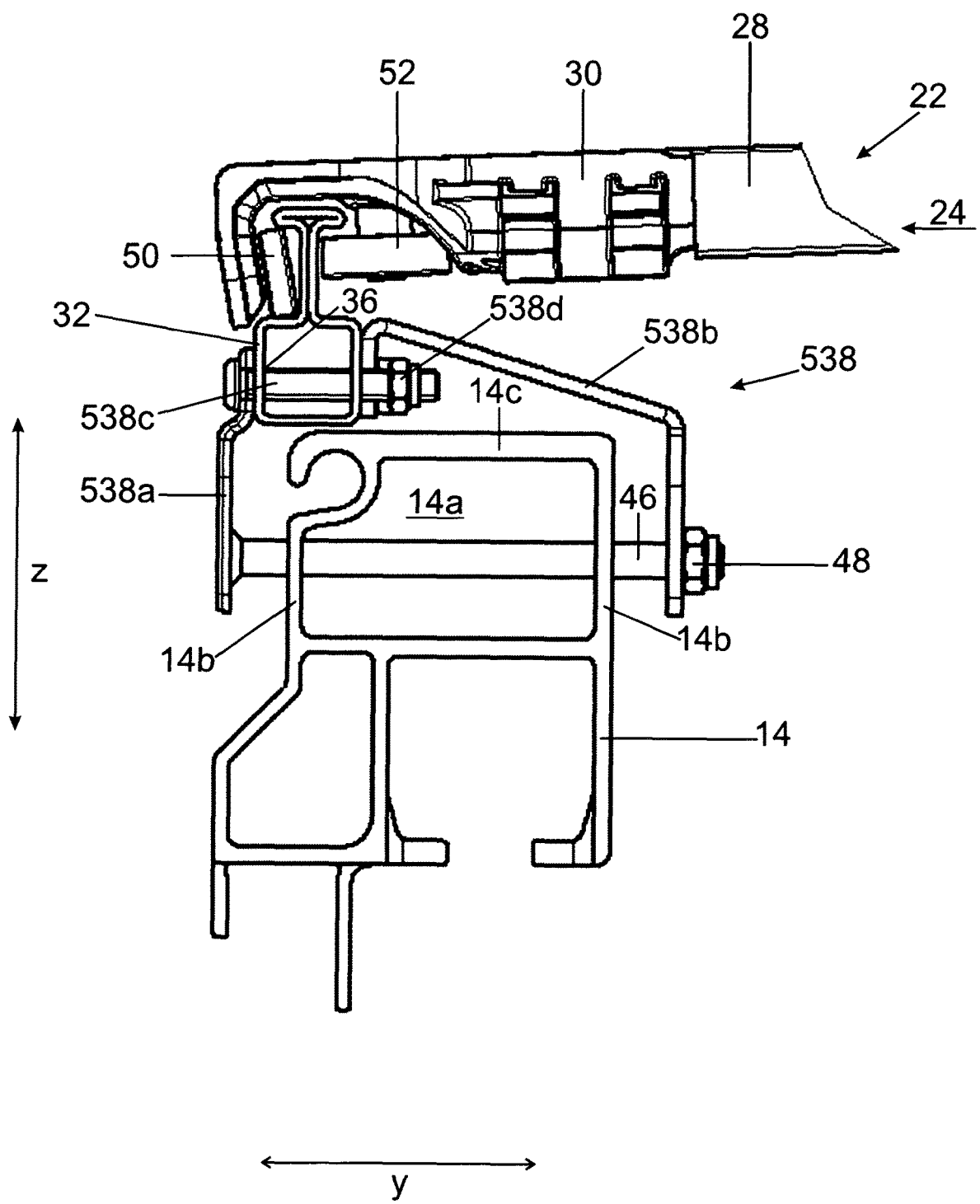
FIG. 10 shows a cross section through a further preferred embodiment of an openable superstructure according to the invention.
Figure 11:
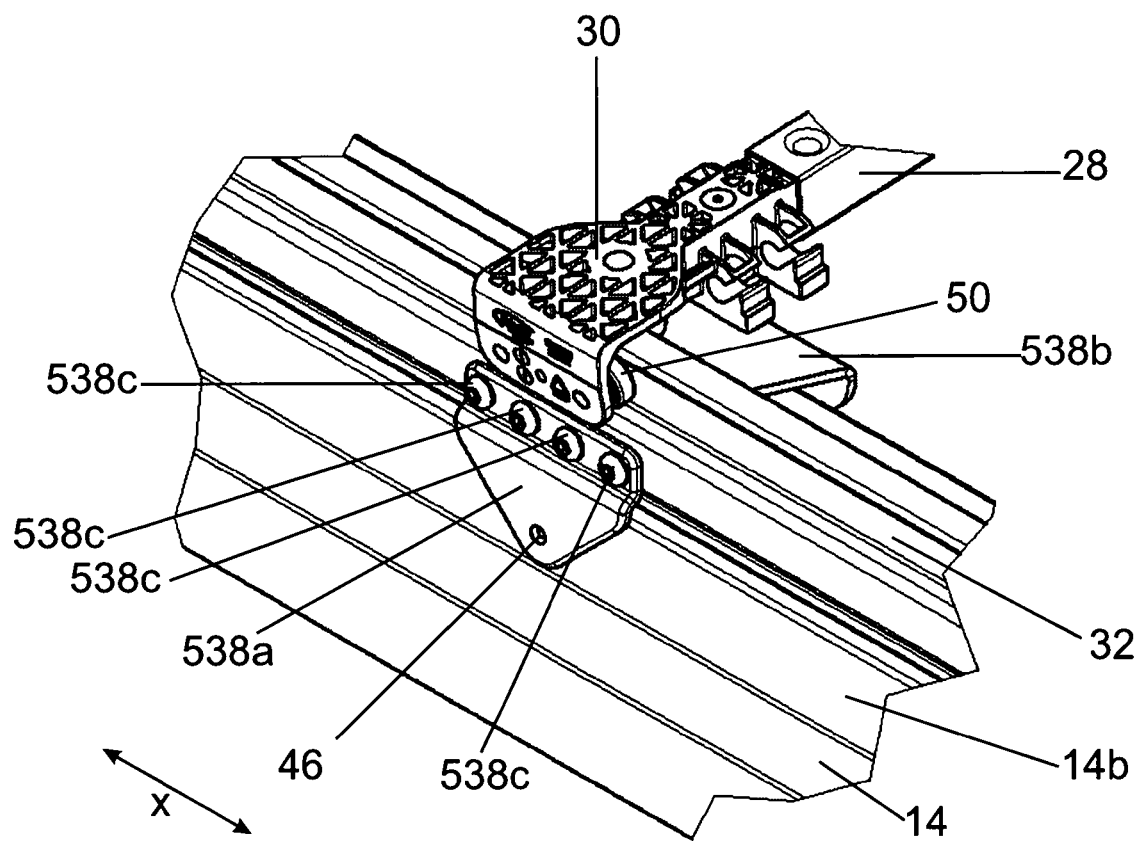
FIG. 11 shows a cutout of the superstructure of FIG. 10 in a perspective view from the outside.
Figure 12:
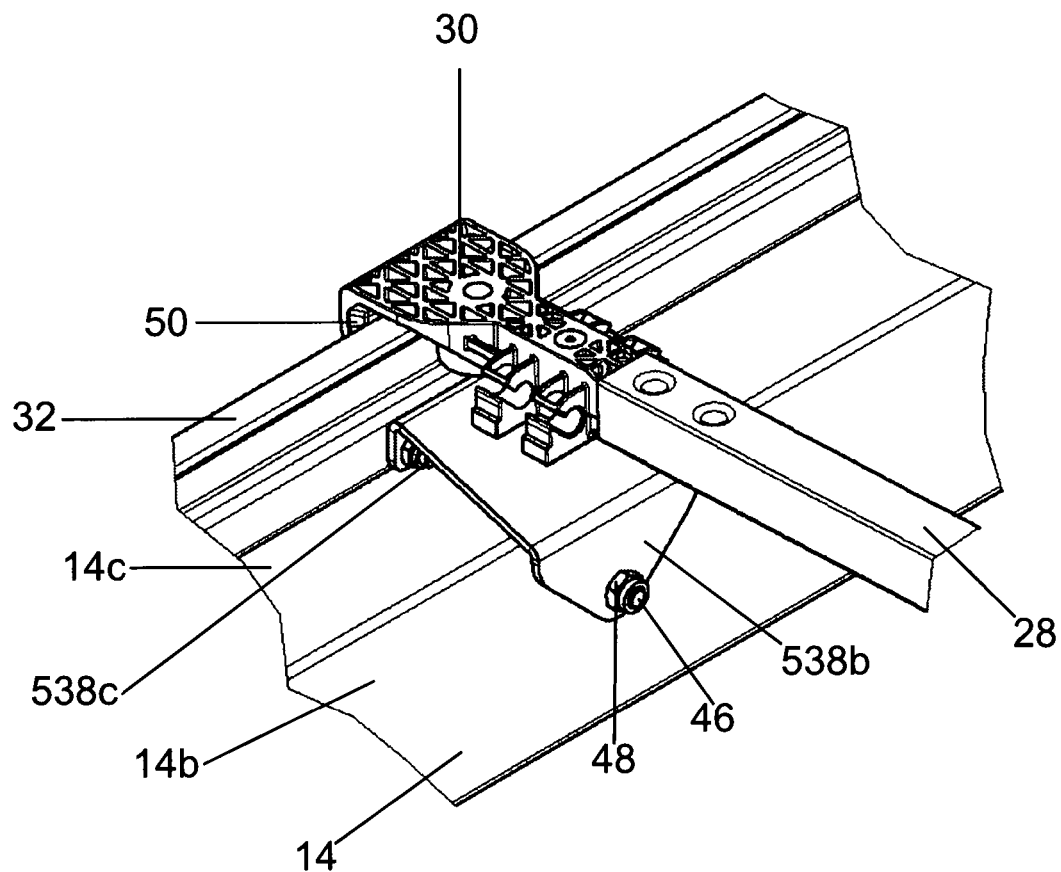
FIG. 12 shows a cutout of the superstructure of FIGS. 10 and 11 in a perspective view from the inside.

FIGS. 10 to 12 show a further alternative embodiment, in which the same reference numerals as in the embodiment according to FIGS. 1 to 3 designate the same or structurally comparable parts.

In contrast to the embodiment according to FIGS. 1 to 3, the longitudinal beam member 32 is not movably connected via a bolt to a support frame which is firmly connected to the substructure, but the support frame 538 is firmly connected to the longitudinal beam member 32. The longitudinal beam member 32 is arranged together with the support frame 538 so as to be adjustable in a direction y transverse to the displacement direction of the carriages 30. As a result, the longitudinal beam member 32 can be displaced back and forth transversely to the displacement direction of the carriages 30 and thus follow the forces introduced by the hoops or struts 28.

The side wall 14 here advantageously has an upper chamber 14a, the two lateral boundary walls 14b of which are equipped with a horizontal bore through which a thread bolt 46 passes. The thread bolt 46 is part of the support frame 538, which comprises a stepped outer fitting 538a and a V-shaped bracket 538b, wherein the bolt 46 penetrates a hole in the fitting 538a and further penetrates a bore in the bracket 538b and is fixed thereto with a nut 48. The fitting 538a and the bracket 538b are formed as bent sheet parts made of metal and have sufficient rigidity in order not to buckle under the load on the folding-top framework.

The bolt 46 is preferably stepped in the region of its contact with the bracket 538b in order to prevent the bolt 46 from being able to perform a relative movement with respect to the fitting 538a and/or the bracket 538b. The thread bolt 46 is cylindrical and can be moved back and forth in the cylindrical bores in the side walls 14b of the chamber 14a. The bolt 46 and the bores thus ensure a defined axial guide.

The bracket 538b comprises a base shown obliquely in FIG. 10 and two vertical legs, of which the larger leg is penetrated by the thread bolt 46. Another connecting bolt 538c connects an upper end of the fitting 538a and the short leg of the bracket 538b to the longitudinal beam member 32 on its outward-facing side walls, in that the connecting bolt 538c passes through bores 36 in these parts and is fixed with a nut 538d. The connecting bolt 538c does not allow any play between the longitudinal beam member 32 and the support frame 538, but it is possible to allow a small play and thus an additional mobility in the y direction.

If the carriage 30 now rolls along the T-shaped upper part of the longitudinal beam member 32, the longitudinal beam member 32 is displaced together with the support frame 538 in the y direction in that the bolt 46 together with the support frame 538 and the longitudinal beam member 32 is displaced back and forth into the bores in the side walls 14b.

The advantage of this configuration is, in particular, that an existing side wall 14 does not have to be significantly increased, but rather can be equipped with the bolt 46 simply by making bores. This increases the overall height of the superstructure in a barely noticeable manner. In addition, the upper wall 14c of the substructure 14 carried by the side walls 14b of the chamber 14a constitutes a support surface on which the longitudinal beam member 32, which maintains a defined distance from it, can rest under heavy load, so that there is no deformation of the support frame 538.

It has to be understood that also differently designed longitudinal beam members 32 can be connected to the support frame 538. It has further to be understood that a plurality of support frames 538 are connected to the longitudinal beam member 32 and accordingly the chamber 14a or the bores provided therein in each case receive a thread bolt 46 in an axially movable manner at a plurality of locations. It can be seen in particular in FIG. 11 that a plurality of connecting bolts 538c penetrate the longitudinal beam member 32 for connection to the support frame 538 or the fitting 538a and the bracket 538b, so that the relatively high moment load cannot lead to a deformation of the support frame 538.

Figure 13:
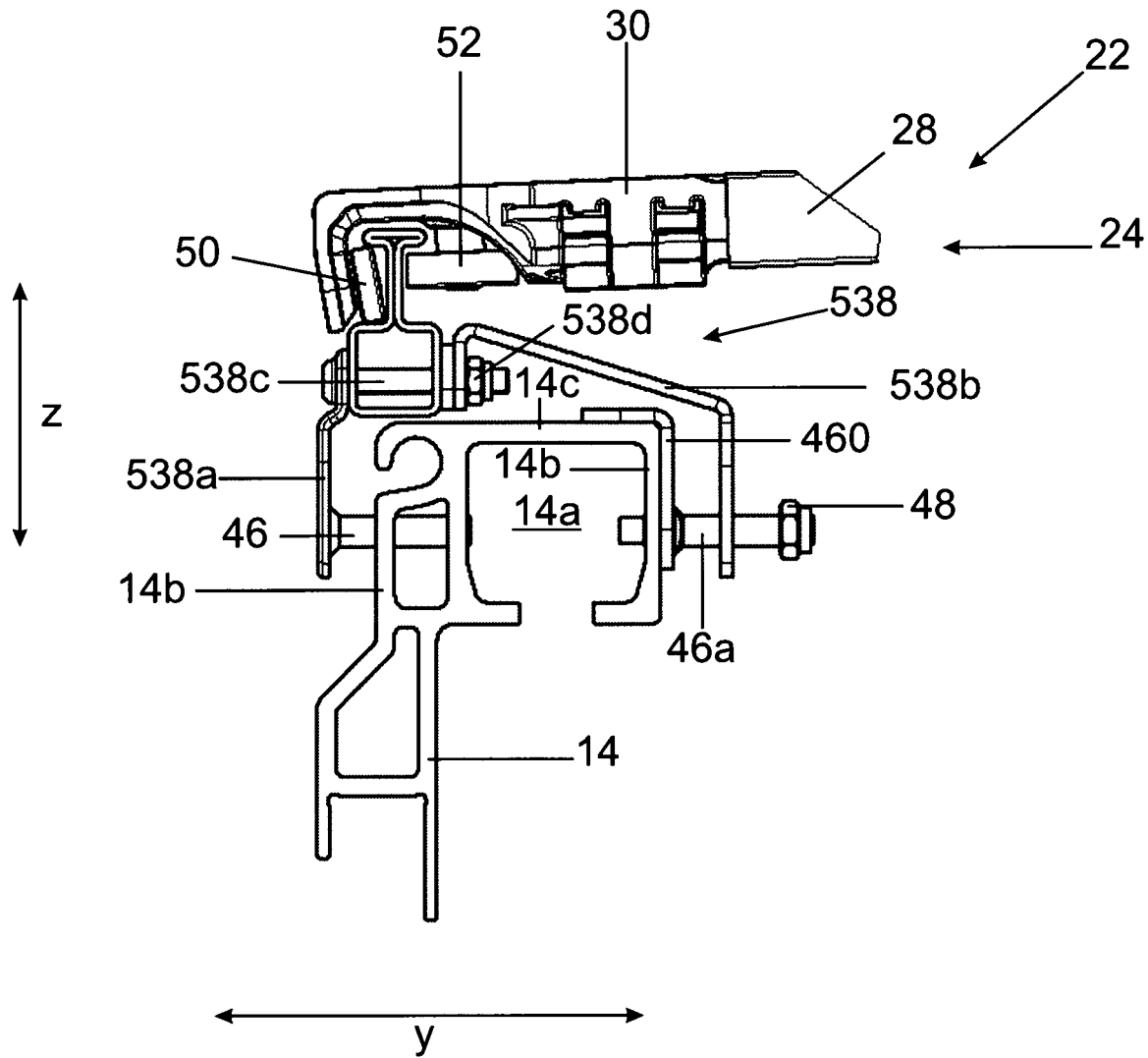
FIG. 13 shows a cross section through an alternative embodiment of an openable superstructure according to the invention.
Figure 14:
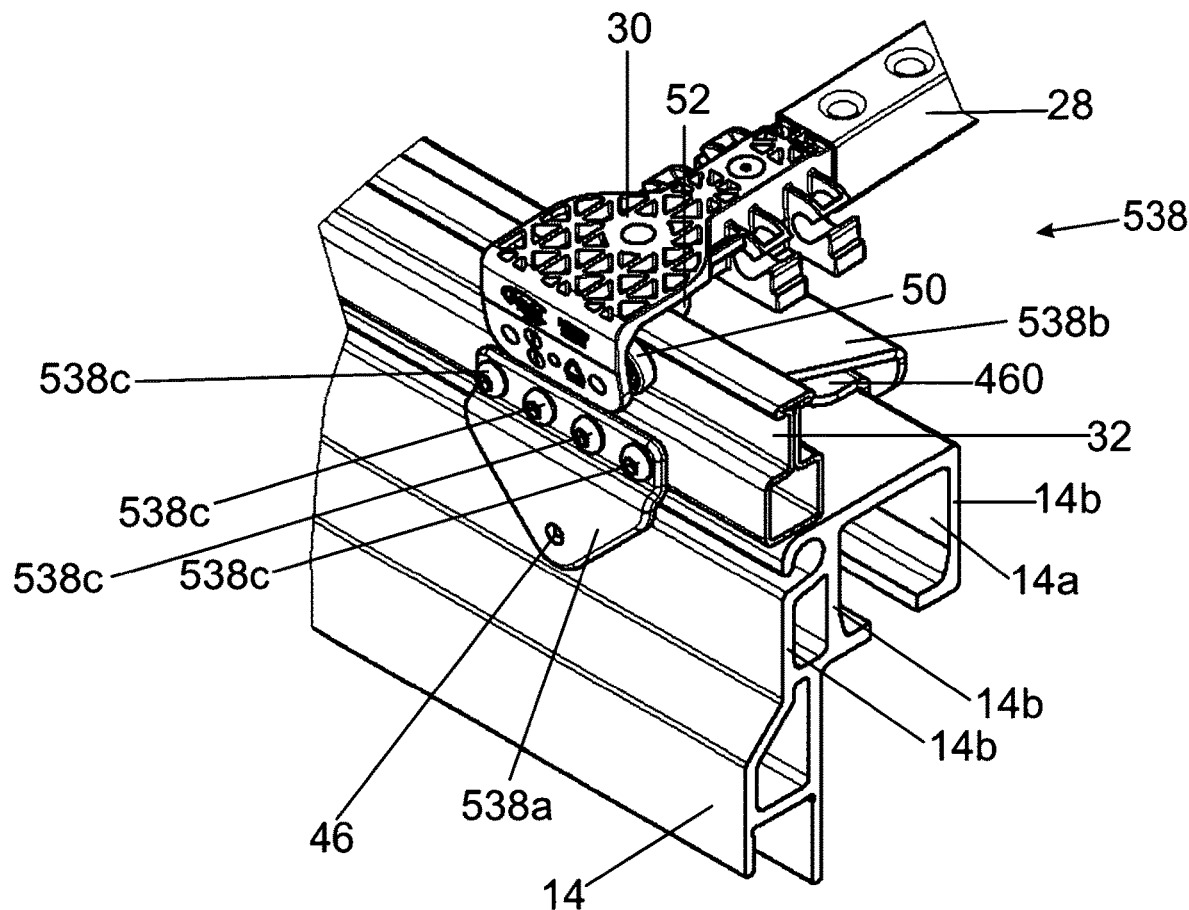
FIG. 14 shows a cutout of the superstructure of FIG. 13 in a perspective view from the outside.
Figure 15:
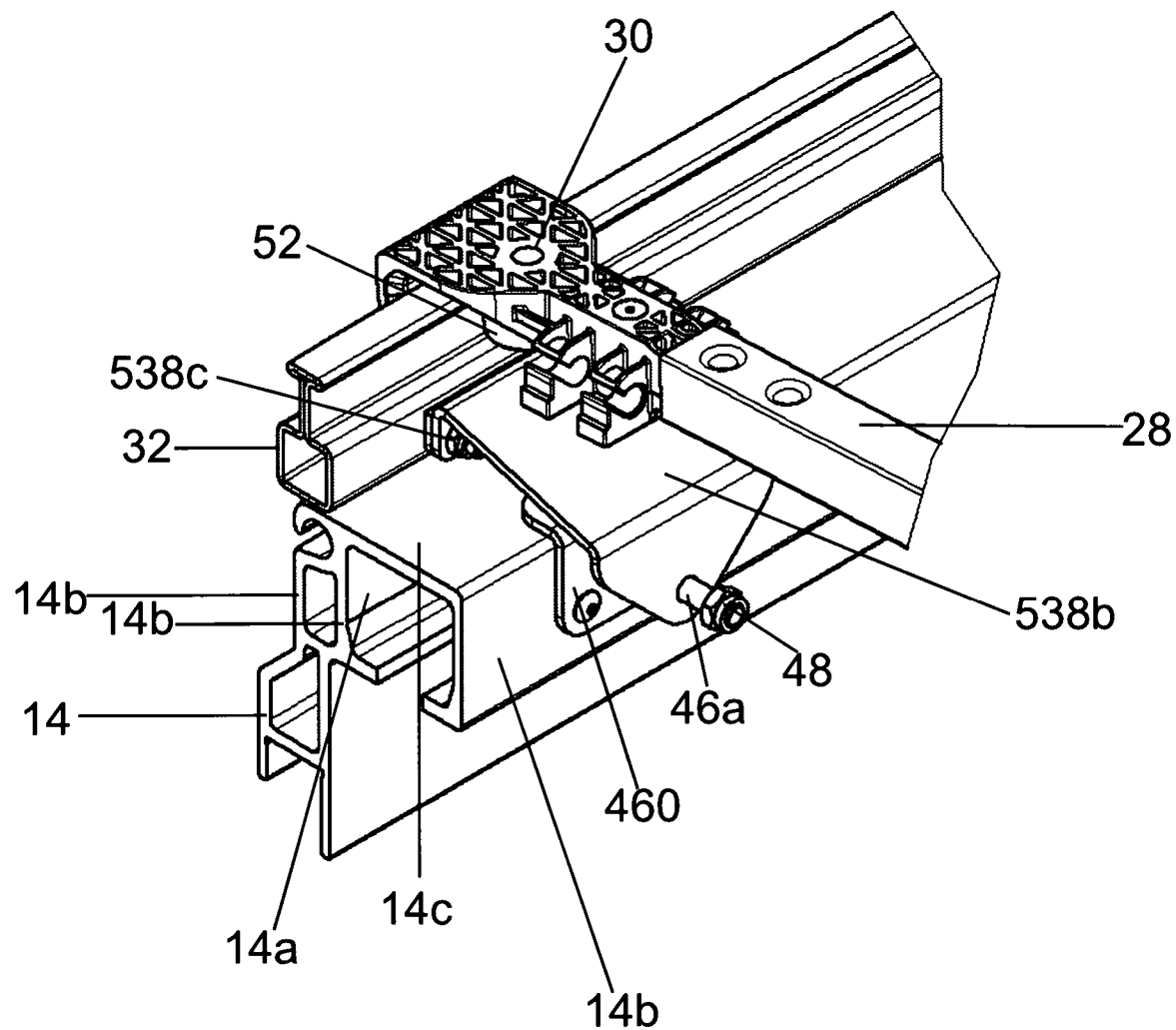
FIG. 15 shows a cutout of the superstructure of FIGS. 13 and 14 in a perspective view from the inside.

FIGS. 13 to 15 show a modification of the embodiment according to FIGS. 10 to 12, the same reference numerals as in the embodiment according to FIGS. 10 to 12 denoting the same or structurally comparable parts.

In contrast to the embodiment from FIGS. 10 to 12, a continuous screw bolt 46 is not provided, by means of which the support frame 538 is connected to the upper chamber 14a of the side wall 14, but rather this function is distributed to two thread bolt stubs 46, 46a, of which the first thread bolt stub 46 displaceably passes through a side wall 14b of the side wall 14 and is firmly connected to the fitting 538a, while the further thread bolt stub 46a displaceably passes through the bracket 538b or a bore provided in the region of its long leg.

The fitting 538a is in this case firmly connected to the thread bolt stub 46, so that the movement in the y direction substantially takes place by a back and forth movement of the thread bolt stub 46 in corresponding bores in the side walls 14b of the side wall 14, two of which walls 14b are penetrated in the embodiment shown.

In contrast to this, the thread bolt stub 46a, which passes through the bracket 538b, is fixedly connected to the wall 14b, for example by welding or riveting, and makes possible the displacement in a bore in the leg of the bracket 538b along the thread bolt stub 46a. The displacement path is limited by the shorter of the two thread bolt stubs 46, 46a, however a nut 48 is applied to the one thread bolt stub 46a in order to provide an end stop for the support frame 538.

It can be seen that in the present embodiment the inward-pointing thread bolt stub 46a is part of the side wall 14b since it is connected to it in a non-movable manner and does not belong to the support frame 538.

It can also be seen that, instead of a cylindrical bolt, a bolt with a polygonal cross section can also be used if the bore is designed in such a way that there is a mutual guide.

It can also be seen that the guide can be formed both on the moving part and on the immovable part.

Figure 16:
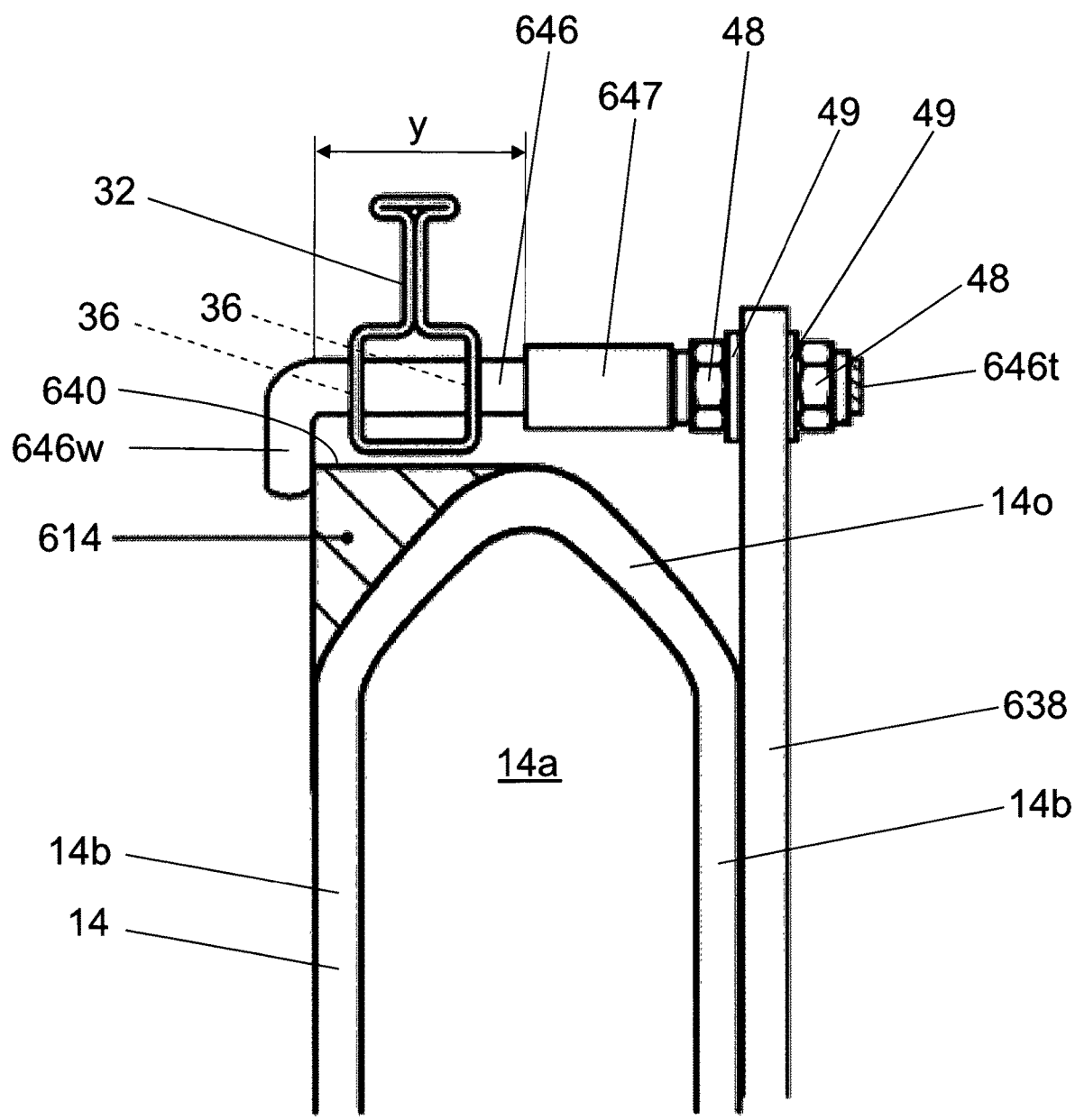
FIG. 16 shows a cross section through a further preferred embodiment of an openable superstructure according to the invention.

FIG. 16 shows a further alternative embodiment, in which the same reference numerals as in the embodiment according to FIGS. 1 to 3 designate the same or structurally comparable parts.

The side wall 14 has an upper chamber 14a, which is enclosed by two boundary walls 14b. An upper wall 14o of the chamber 14a has a rounded or polygonal profile that does not provide a sufficiently wide base on which the longitudinal beam member 32 could rest to prevent blows from above damaging the side wall 14. A panel 614 is therefore connected in sections to the side wall 14 and in places provides a flat upper side or a base portion 640.

A support frame piece 638 is screwed, riveted, or welded onto the inner boundary wall 14b of the side wall 14 and extends beyond the maximum height of the upper wall 14o. In the region of the protrusion, a bore is provided on the support frame piece 638, wherein a bolt 646 passes through the bore. The bolt 646 has at one end a threaded portion 646t which is movable in the bore and can then be fixed to the support frame piece 638 by means of two nuts 48. The other end of the bolt 646 is formed with an angled end 646w, but can also be limited with a rivet head or with a nut.

Before the bolt 646 is fixed on the support frame piece 638, the longitudinal beam member 32 is pushed onto the bolt by means of two bores 36. Furthermore, a spacer 647 is pushed onto the bolt 646, which limits the adjustment path y of the longitudinal beam member 32 with respect to the bolt, so that the lower portion of the longitudinal beam member 32 can only be adjusted between the angled end 646w and the spacer 647. Here, the distance of the lower part of the longitudinal beam member 32 from the panel 614 is quite small, so that in the event of a large load, for example due to a blow, the panel 614 supports the longitudinal beam member 32. It can be seen that the support frame piece 638 and the bolt coupled to it form a stable and easily retrofittable guide for the adjustment of the longitudinal beam member 32. It can also be seen that it is not mandatory to mount the bolt 646 on both sides, but that one-sided mounting is sufficient. It can also be seen that it is not imperative to provide the support frame as a continuous profile over the length of the longitudinal beam member 32, but that it is sufficient if the support frame is arranged in sections on the substructure.

In FIG. 16, a simple and reliable method for equipping a substructure 12, in the present case a side wall 14 of the substructure 12, with an openable superstructure 10 is illustrated. For this purpose, a longitudinal beam member 32 that is infinitely adjustable and not lockable with respect to the substructure 12 is connected to the substructure by means of a plurality of bolts 346 and one or more support frame pieces 638, wherein the longitudinal beam member 32 has a defined free adjustment path y transverse or perpendicular to the main extension thereof reaching into the paper plane. If a support frame 638, 646 having an adjustable longitudinal beam member 32 is connected to each of the inner sides of the opposite side walls 14, the sliding roof 22 can be shifted along the longitudinal beam members 32, which then adjust so that the distance between the longitudinal beam members 32 corresponds to the dimension of the sliding roof.

The invention has been explained above on the basis of embodiments in which the longitudinal beam member 32, alone or with connected parts on a bolt, is adjustable transversely to the main extension thereof. It has to be understood that the bolt can also be connected to the longitudinal beam member and thus the longitudinal beam member can be adjusted with respect to a bore. Furthermore, it has to be understood that the bolt can be fixed at both ends, but it is sufficient if it is only fixed at one end.

The invention has been explained above on the basis of embodiments in which the longitudinal beam member 32 is loaded on both sides by means of coil springs 54 towards a central adjustment position. It has to be understood that other designs of spring members can also be used for this purpose, and that only one-sided loading of the longitudinal beam member 32 is possible. Tension springs can also be provided instead of compression springs. Spring members are used particularly expediently, which are completely or almost completely relaxed in the central adjustment position of the longitudinal beam member, so that there is no displacement of the longitudinal beam member 32 in the opposite direction even if a spring member breaks.

The invention has been explained above using an embodiment in which the openable superstructure 10 closes the top and thus a roof of the substructure 12. It has to be understood that a side or rear opening of the substructure 12 can also be closed in a corresponding manner, wherein the displacement of the longitudinal beam member 32 then substantially takes place in the z direction perpendicular to the displacement of the carriages 30.

The invention has been explained above using an embodiment in which the folding-top framework has two adjustable longitudinal beam members 32 on each side 14 of the substructure 12. It has to be understood that it can also be sufficient to equip only one side with an adjustable longitudinal beam member 32, while the longitudinal beam member on the other side is stationary and not adjustable.

The invention has been explained above on the basis of embodiments in which the longitudinal beam member 32 is displaced substantially in the y direction, that is to say perpendicular to the displacement direction of the carriage in the x direction. It has to be understood that it is sufficient if the longitudinal beam member is adjusted transversely to the displacement direction of the carriage, and that in particular components of the other two directions can compose the adjustment direction.

The invention has been explained above on the basis of embodiments in which the substructure 12 has upstanding side and end walls 14, 16, 18. It has to be understood that the substructure 12 can also consist of only a largely flat plane, for example the loading platform of a semitrailer, and that the superstructure then substantially encloses a three-dimensional space, as is the case, for example, with sliding-bow folding-tops.

The invention has been explained above on the basis of embodiments in which the longitudinal beam member 32 is deflected passively in response to the forces introduced by the carriage 30. It has to be understood that the forces introduced by the carriages 30 can also be measured, and in response to this the longitudinal beam member is adjusted in its position by motor in order to assume an optimal position.

The invention has been explained above on the basis of embodiments in which the support frame 38 engages over the longitudinal beam member 32 and thus prevents the longitudinal beam member 32 from lifting off. In the same way, however, the longitudinal beam member can also overlap the support frame, as indicated, for example, in FIG. 8, with the further advantage that no dirt or rainwater falling from above can get into the region between the longitudinal beam member 32 and the support frame 38.

The invention has been explained above on the basis of embodiments in which the relatively movable connection of the longitudinal beam member 32 and of the substructure 14 is mediated by a support frame 38, 538 which is coupled to one of the two in a fixed or movable manner. It has to be understood that the support frame can also be constructed in one unit with one of the two parts of longitudinal beam member 32 and substructure 14, so that the support frame is no longer provided as a separate part. Accordingly, the provision of a support frame is preferred, but optional.

The invention claimed is:

1. Openable superstructure for a substructure, comprising a folding-top framework to which a covering element of weather-resistant material can be connected,
wherein the folding-top framework comprises a plurality of carriages which are displaceable along at least one guide,
wherein the guide comprises a longitudinal beam member along which the carriages are displaceable,
wherein the longitudinal beam member is adjustably arranged at least in sections in a direction transverse to a displacement direction of the carriages during a displacement, and wherein the longitudinal beam member is pre-stressed into an initial position by at least one spring element.

2. Openable superstructure according to claim 1, wherein the longitudinal beam member is an elongated profile such as a rail.

3. Openable superstructure according to claim 1, wherein the guide comprises a support frame.

4. Openable superstructure according to claim 3, wherein one of the openable substructure and the longitudinal beam member is connected to the support frame, wherein the other of the openable substructure and the longitudinal beam member is adjustably coupled to the support frame in said direction transverse to the displacement direction of the carriages.

5. Openable superstructure according to claim 3, wherein the longitudinal beam member is received in the support frame.

6. Openable superstructure according to claim 3, wherein the support frame is adjustably connected to the openable substructure.

7. Openable superstructure according to claim 3, wherein the support frame is connected to one of the longitudinal beam member and the substructure via a coupling part which permits a relative movement.

8. Openable superstructure according to claim 7, wherein the coupling part is a bolt which is fixed to the support frame and along which the longitudinal beam member is adjustable.

9. Openable superstructure according to claim 7, wherein the coupling part is a lever-type link, wherein the link is articulated to the support frame about a first axis, wherein the link is articulated to the longitudinal beam member about a second axis such that the link can pivot about said first and second axes for the adjustment of the longitudinal beam member.

10. Openable superstructure according to claim 7, wherein the coupling part is a projection provided on one of the support frame and the longitudinal beam member which is movably inserted in a groove in the other of the support frame and the longitudinal beam member.

11. Openable superstructure according to claim 7, wherein the coupling part is one of a rolling element and a sliding element provided on one of the support frame and the longitudinal beam member.

12. Openable superstructure according to claim 7, wherein the coupling part is a bolt which is fixed to the support frame and which is adjustable relatively to the openable substructure.

13. Openable superstructure according to claim 7, wherein the coupling part is a bolt which is fixed to the openable substructure and with respect to which the support frame is adjustable.

14. Openable superstructure according to claim 7, wherein the coupling part is loaded by at least one pretensioning device in or against an adjustment direction of the longitudinal beam member.

15. Openable superstructure according to claim 3, wherein the support frame overlaps at least a portion of the longitudinal beam member and thus prevents the longitudinal beam member from being lifted off the openable substructure.

16. Openable superstructure according to claim 1, wherein a spring element is arranged on both sides of the longitudinal beam member, and wherein the spring elements prestress the longitudinal beam member in a direction of a presettable initial position.

17. Openable superstructure according to claim 1, wherein the direction transverse to the displacement direction of the carriages comprises one of a horizontal component and a vertical component.

18. Openable superstructure according to claim 1, wherein two carriages opposite each other are coupled to one another by a strut.

19. Openable superstructure according to claim 1, wherein the carriage comprises a guide roller and a support roller, and wherein the longitudinal beam member comprises at least a first track for the support roller of the carriage and at least a second track for the guide roller of the carriage.

20. Openable superstructure according to claim 1, wherein the folding-top framework is designed as a sliding roof which is moveable along two longitudinal beam members supported by side structures.

21. Openable superstructure according to claim 1, wherein the force for the adjustment of the longitudinal beam members in said transverse direction is imparted by the displacement of the carriages along the longitudinal beam members.

* * * * *